US 12,493,066 B2

(12) United States Patent
Kishi et al.

(10) Patent No.: US 12,493,066 B2
(45) Date of Patent: Dec. 9, 2025

(54) FILTER BANK CIRCUIT, SPECTRUM ANALYZER, SIGNAL ANALYZER, SIGNAL GENERATOR USING THE SAME, AND CONTROL METHOD FOR THE FILTER BANK CIRCUIT

(71) Applicant: ANRITSU CORPORATION, Atsugi (JP)

(72) Inventors: Yuji Kishi, Atsugi (JP); Kenichi Watanabe, Atsugi (JP)

(73) Assignee: ANRITSU CORPORATION, Atsugi (JP)

( * ) Notice: Subject to any disclaimer, the term of this patent is extended or adjusted under 35 U.S.C. 154(b) by 147 days.

(21) Appl. No.: 18/402,871

(22) Filed: Jan. 3, 2024

(65) Prior Publication Data
US 2024/0319241 A1    Sep. 26, 2024

(30) Foreign Application Priority Data
Mar. 20, 2023    (JP) ................... 2023-043991

(51) Int. Cl.
*G01R 23/163*    (2006.01)
*G01R 23/167*    (2006.01)

(52) U.S. Cl.
CPC ......... *G01R 23/163* (2013.01); *G01R 23/167* (2013.01)

(58) Field of Classification Search
CPC ...... H03H 19/004; H03H 7/38; H03H 7/0123; H03H 7/0161
See application file for complete search history.

(56) References Cited

U.S. PATENT DOCUMENTS

| 5,111,508 | A  | * | 5/1992  | Gale        | H04S 7/307 |
|           |    |   |         |             | 381/100 |
| 9,172,422 | B2 | * | 10/2015 | Desclos     | H04B 1/525 |
| 2013/0241666 | A1 | * | 9/2013  | Granger-Jones | H04B 1/1027 |
|           |    |   |         |             | 333/132 |
| 2015/0295609 | A1 | * | 10/2015 | Chang       | H04B 1/16 |
|           |    |   |         |             | 375/316 |
| 2016/0211820 | A1 | * | 7/2016  | Bagger      | H04B 1/04 |
| 2018/0019831 | A1 | * | 1/2018  | Zhang       | H04B 1/001 |
| 2019/0013790 | A1 | * | 1/2019  | Ayranci     | H04B 1/0053 |

FOREIGN PATENT DOCUMENTS

JP    2009246956 A    10/2009
JP    2014120842 A    6/2014

* cited by examiner

*Primary Examiner* — Huy Q Phan
*Assistant Examiner* — Temilade S Rhodes-Vivour
(74) *Attorney, Agent, or Firm* — Greer Burns & Crain Ltd.

(57) ABSTRACT

The present invention provides a filter bank circuit capable of measuring or testing a frequency band, a spectrum analyzer, a signal analyzer, a signal generator using the filter bank circuit, and a method for controlling the filter bank circuit. A filter bank circuit 10 includes, for example, a one-pole two-throw changeover switch 20 and filter groups G1 and G2, each of which has m filters. The passbands of the filters included in each filter group do not overlap with each other, and the adjacent passbands of the filters included in all the filter groups overlap with each other.

10 Claims, 16 Drawing Sheets

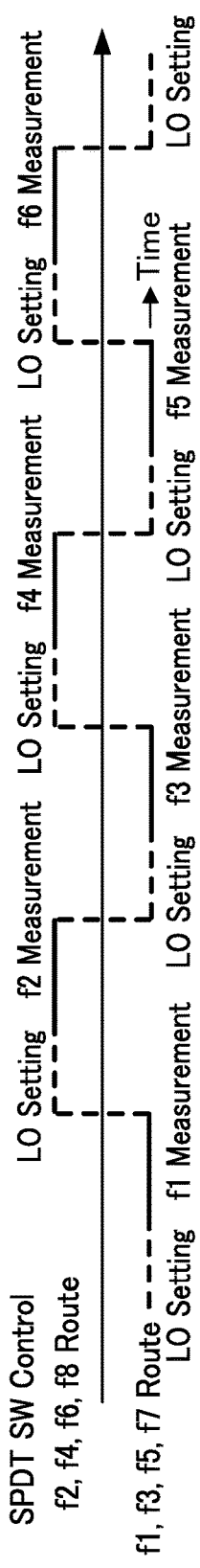
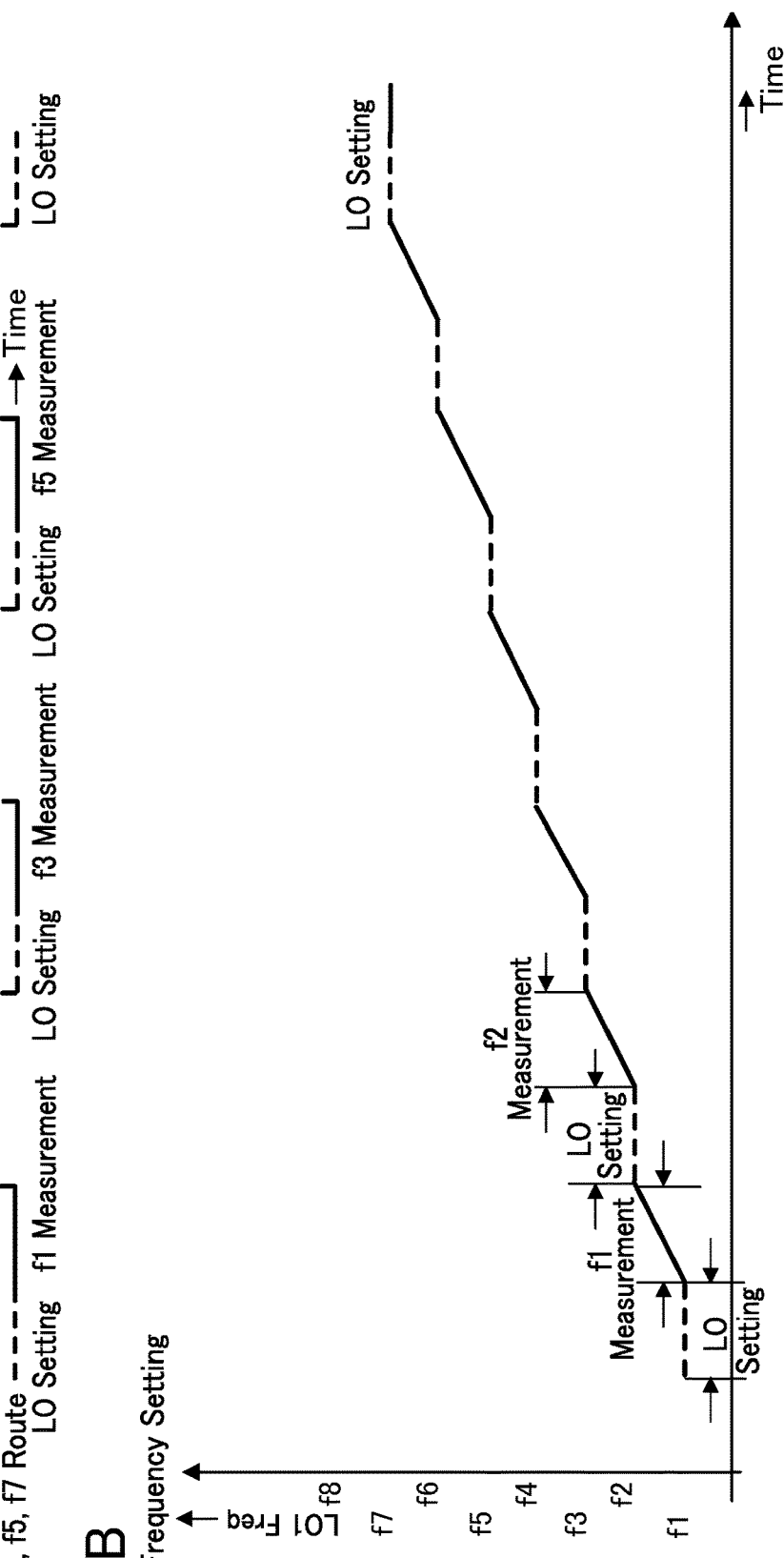
FIG. 6A
FIG. 6B

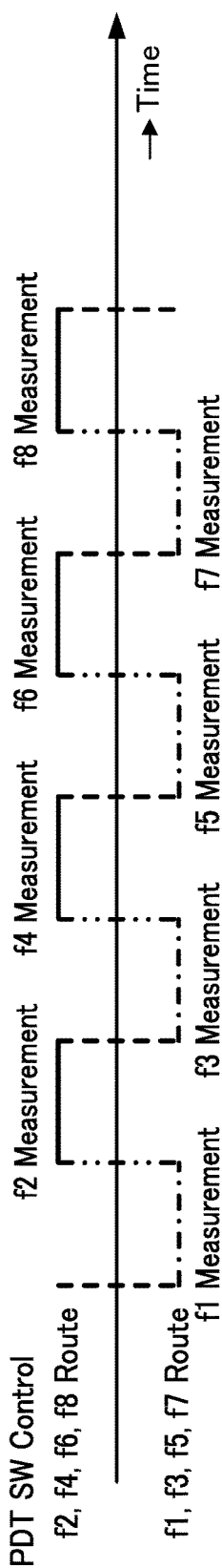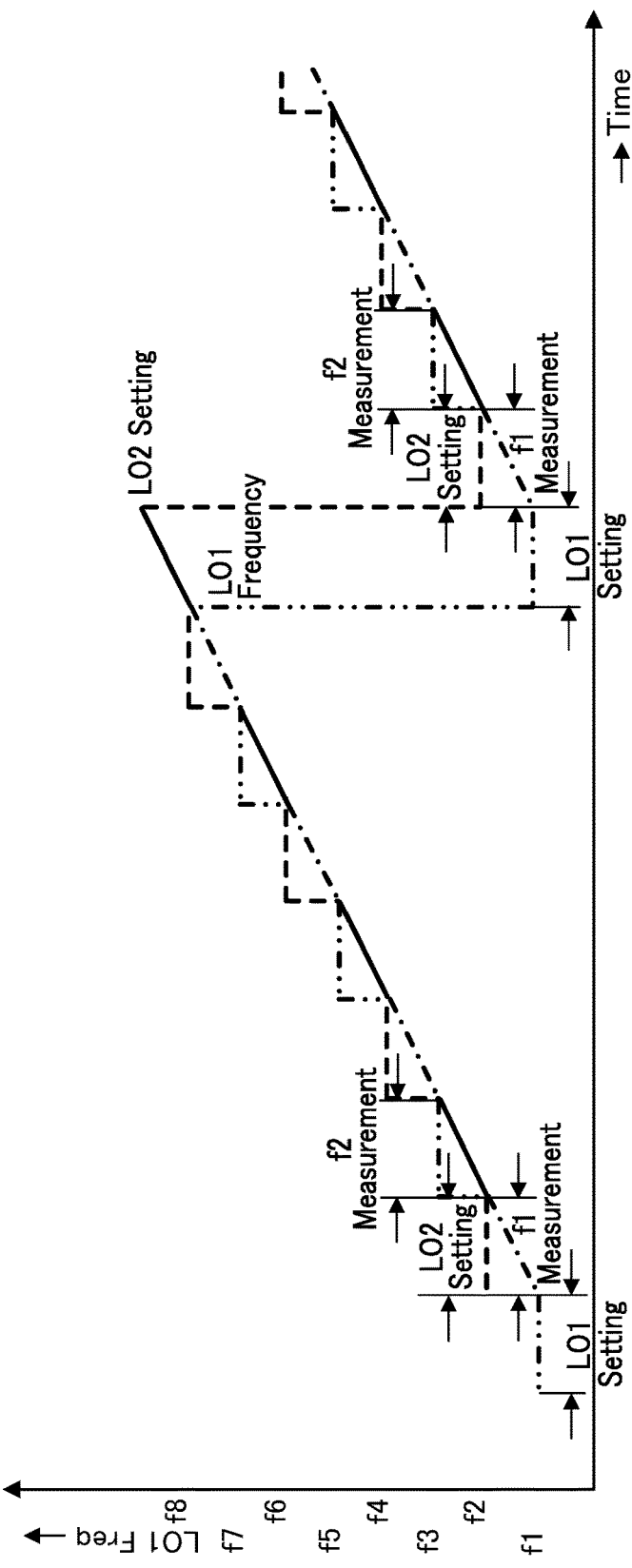
FIG.9A
FIG.9B

FILTER BANK CIRCUIT, SPECTRUM ANALYZER, SIGNAL ANALYZER, SIGNAL GENERATOR USING THE SAME, AND CONTROL METHOD FOR THE FILTER BANK CIRCUIT

CROSS-REFERENCE TO RELATED APPLICATIONS

This application claims Convention priority to Japanese Patent Application No. 2023-043991, filed Mar. 20, 2023, the entire contents of which are incorporated herein by reference.

FIELD OF THE INVENTION

The present invention relates to a filter bank circuit that maintains overlap between filter bands by changeover of filter groups on a group-by-group basis, a spectrum analyzer, a signal analyzer, and a signal generator using the same, and a method for controlling the filter bank circuit.

BACKGROUND ART

Some measurement equipment requires the function of a demultiplexer to separate each channel from a signal in which multiple frequency channels are bundled, or conversely, the function of a multiplexer to combine multiple frequency channels.

As this type of measurement equipment, for example, a frequency conversion device that has a signal demultiplexer that divides a predetermined frequency region into a plurality of bands, extracts signal components of each divided band, and outputs them in parallel has conventionally been known (for example, Patent Document 1 and the like).

Further, a front-end circuit installed at the front end of the measurement equipment, including three circulators, three transmitting filter banks, and three receiving filters between the first switch connected to the first antenna and the RFIC is known (for example, FIG. 4 of Patent Document 2). The front-end circuit is capable of transmitting and receiving multiple (three types) frequencies.

CITATION LIST

Patent Literature

Patent Document 1: Japanese Patent Application Publication No. 2009-246956
Patent Document 2: Japanese Patent Application Publication No. 2014-120842

SUMMARY OF THE INVENTION

Technical Problem

Examples of measurement equipment having a front-end circuit with a filter function such as a transmission filter bank and a reception filter bank described in Patent Document 2 include a spectrum analyzer, a test signal generator, and the like.

A conventional spectrum analyzer includes, for example, a filter bank 200 having a structure shown in FIG. 17 before a frequency conversion Unit (corresponding to the frequency conversion unit 100 in FIG. 4) forming a front-end circuit. For example, this filter bank 200 includes a movable part 201 that accommodates a plurality of band-pass filters BPF 1, BPF2, . . . , BPFn each having a different passband in the millimeter wave band. The filter bank 200 has a configuration in which the movable part 201 is held within the mounting portion 202 so that it can move in the direction of the arrow (vertical direction). An input side (In) radio waveguide 203*a* and an output side (Out) radio waveguide 203*b* are provided at both ends of the mounting portion 202, and the radio waveguide 203*a* and the radio waveguide 203*b* are arranged on a straight line. In this conventional filter bank 200, the movable part 201 is moved so that the BPF corresponding to the desired frequency (BPF3 in this example) is placed between the radio waveguides 203*a* and 203*b* on both sides within the mounting part 202, whereby, among the signals to be measured inputted from the side (In), a signal with a frequency component corresponding to the passband of the BPF 3 is extracted.

Since, in a spectrum analyzer that employs the above-described filter bank 200, there must be no unmeasurable band, adjacent filter bands of BPF1 to BPFn must overlap. Further, this overlapping band needs to be wider than the band occupied by the signal under test or the signal for test so that the signal under test or the signal for test is not dropped.

According to the configuration of the conventional filter bank 200 described above, since the plurality of BPFs are mechanically switched, the changeover time is long, so that the mechanical life for changeover is limited. On the other hand, as there is an increasing demand for measuring faster signals such as 5G and millimeter wave bands, it was difficult to switch the passband at high speed and with high precision by the filter bank 200, which is mechanically switched with a switch.

As one of the filter techniques that does not cause problems of the changeover time or service life of a switch, for example, a filter group configured with a duplexer configuration that is a combination of hybrid circuits that do not have moving parts is known.

However, according to the filter group having this duplexer configuration, it is necessary to provide an appropriate guard band (region where the bands do not overlap) so that adjacent filter bands in the filter group do not overlap. For this reason, a filter group configured as a duplexer with no moving parts could not be applied as is as a filter bank for a spectrum analyzer where adjacent filter bands must overlap. In other words, even if a filter group with a conventional duplexer configuration without moving parts is applied directly to the front-end circuit of a spectrum analyzer, the duplexer requires a guard band, so the overlap between adjacent filter bands can be prevented, so that a band that could not be measured occurred.

Therefore, for the front-end circuits of spectrum analyzers and test signal generators, there has been a strong need for a configuration that could handle smooth, high-precision measurements in all bands without having to deal with problems such as speed and longevity, by using filter groups configured by the duplexers or multiplexers without moving parts.

The present invention was made to solve these conventional problems, and the purpose of this invention is to provide a filter bank circuit that uses an electronically switchable switch and multiple filter groups, and that can handle measurement or testing of all bandwidths by securing guard bands within each filter group and switching filter groups with simple changeover control, thereby securing overlap between adjacent filter bands in the filter groups as a whole. Also, the purpose of the invention is to provide a spectrum analyzer, a signal analyzer, and a signal generator that use the filter bank circuit, and a control method of the filter bank circuit.

Means to Solve Problems

In order to solve the above problem, a filter bank circuit according to an aspect of the invention includes: a one-pole n-throw type switch that performs changeover among n (n is an integer of 2 or more) output terminals connected to one input terminal; and n filter groups respectively connected to the n output terminals, each of the filter groups having m (m is an integer of 2 or more) filter circuits; wherein each of the filter circuits in the n filter groups has a passband that does not overlap with a passband of any other filter circuit in the same filter group, and overlaps with a passband of one filter circuit in other one filter group by a predetermined bandwidth. The predetermined bandwidth may be set to a band wider than a band occupied by a signal inputted to the filter bank circuit for filtering, for example, a signal under test or a test signal so that the signal under test or the test signal will not be missed.

By this configuration, the filter bank circuit according to an embodiment of the present invention can maintain the overlap between the passbands of the filters included in different filter groups while maintaining the guard bands between the passbands of the filters included in the same filter group by switching among a plurality of filter groups for each group. By using the filter groups that do not have moving parts, the filter bank circuit does not require long changeover time or complicated changeover control unlike mechanically switched filter banks. It is possible to measure a signal under test or perform a test on an object under test for all frequency bands with appropriate overlap bands.

Further, in the filter bank circuit according to an aspect of the present invention, when a signal having a predetermined frequency component is inputted to the filter bank circuit, the predetermined frequency component is extracted by dividing the signal into n×m frequency components respectively corresponding n×m mutually overlapping passbands of the n×m filter circuits.

By this configuration, the filter bank circuit according to an aspect of the present invention has no band that cannot be targeted, for example, for measuring or testing a signal under test or a test signal of a predetermined frequency component. It is possible to extract a frequency component with unnecessary radio waves suppressed, by extremely easy and short-time changeover control of the switch.

Further, in the filter bank circuit according to an aspect of the present invention, each of the n×m filter circuits is constituted by a filter bank that has a branch line coupler (BLC) and passes a frequency component of a passband that is set corresponding to the each filter circuit.

By this configuration, the filter bank circuit according to an aspect of the present invention employs the filter bank using the BLC and a band-pass filter (BPF), together with the switch, so that the structure can be simplified and the cost reduction can be achieved.

Further, in the filter bank circuit according to an aspect of the present invention, each of the n m filter circuits may be constituted by a band-pass filter (BPF) that passes a frequency component of a passband set corresponding to the each filter circuit.

By this configuration, in the filter bank circuit according to an aspect of the present invention, each filter circuit in the filter groups can be easily realized using a general-purpose band-pass filter, so that the structure can be simplified and the costs can be reduced.

Further, in the filter bank circuit according to an aspect of the present invention, each of the n m filter circuits may include a circulator and a band-pass filter. The circulator has an input port, an output port, and a transfer port. When a frequency component inputted to the input port is a frequency component corresponding to a passband of the each filter circuit, the circulator outputs the frequency component to the output port. When the frequency component inputted to the input port is outside the passband, the circulator outputs the frequency component from the transfer port to an input port of the next stage. The band-pass filter is connected to the output port, and a passband of the band-pass filter is set according to the passband of the each filter circuit.

By this configuration, in the filter bank circuit according to an aspect of the present invention, each filter circuit in the filter groups can be easily realized using a general-purpose circulator, a band-pass filter, and the like, thereby simplifying the structure and reducing the cost.

Further, in the filter bank circuit according to an aspect of the present invention, each of the n×m filter circuits may be constituted by a combination of a high-pass filter (HPF) and a low-pass filter (LPF) to pass a frequency component of a passband that is set corresponding to the each filter circuit.

By this configuration, in the filter bank circuit according to an aspect of the present invention, each filter circuit in the filter groups can be easily realized using a general-purpose high-pass filter and a general-purpose low-pass filter, thereby simplifying the structure and reducing the cost.

In order to solve the above problem, the spectrum analyzer according to an aspect of the present invention includes: a frequency conversion unit that inputs a signal under test of a predetermined frequency to a mixer together with a local signal outputted from a local signal generator, and has a filter that extracts a signal in a predetermined intermediate frequency band from a signal outputted from the mixer; and a detector that detects a signal in the intermediate frequency band. The spectrum analyzer varies a frequency of the local signal according to a frequency to be analyzed, and determines the spectrum characteristics of the signal under test. The spectrum analyzer includes: the filter bank circuit as described above that is provided before the frequency conversion unit; and a changeover control unit that controls the switch, to which the signal under test is inputted at the input terminal, so that one filter group is selected among a plurality of the filter groups repeatedly in order by group, according to the frequency to be analyzed. The spectrum analyzer sequentially extracts and detects a frequency component that passes through a filter circuit having a passband corresponding to the frequency to be analyzed, each time one filter group is selected by the switch repeatedly in order.

By this configuration, the spectrum analyzer according to an aspect of the present invention can extract the frequency components corresponding to a plurality of (n×m) passbands, which overlap with each other, from the signal under test inputted to the filter bank circuit in the state that unnecessary radio waves are suppressed. The extracted frequency components are detected by the detector. Thus, the smooth measurement of the spectrum characteristics of signals in all bands can be realized by using the filter groups that do not have moving parts without requiring long changeover time or complicated changeover control unlike mechanically switched filter banks.

Further, the spectrum analyzer according to an aspect of the present invention may include: a plurality of local signal generators respectively provided corresponding to a plurality of the filter groups; and a plurality of mixers respectively provided to a plurality of the filter circuits that constitute the plurality of the filter groups. The spectrum analyzer may further comprise a local frequency setting unit that sets local frequencies of the local signal generators for the mixers corresponding to the filter circuits in the filter group to be selected next, while measuring the spectrum characteristics by the filter circuits in the currently selected filter group.

By this configuration, the spectrum analyzer according to an aspect of the present invention can eliminate unnecessary waiting time for setting the local frequency between a time in which the measurement is performed by the filter circuits in a currently selected filter group and a time in which the measurement is performed by the filter circuits in a next filter group, so that smooth measurements can be performed.

In order to solve the above problem, the signal analyzer according to an aspect of the present invention includes: a frequency conversion unit that inputs a signal under test of a predetermined frequency to a mixer together with a local signal outputted from a local signal generator and has a filter that extracts a signal in a predetermined intermediate frequency band from a signal outputted from the mixer; and a signal analysis unit that analyzes a waveform of a signal obtained by converting the signal in the predetermined intermediate frequency band to a digital signal by an analog-to-digital converter (ADC). The signal analyzer varies the frequency of the local signal according to a frequency to be analyzed, and analyzes the waveform of the signal under test. The signal analyzer further includes: the filter bank circuit as described above that is provided before the frequency conversion unit; and a changeover control unit that controls the switch, to which the signal under test is inputted at the input terminal, so that one filter group is selected among a plurality of the filter groups, according to the frequency to be analyzed. The signal analyzer extracts a frequency component that passes through a filter circuit having a passband corresponding to the frequency to be analyzed, converts a signal of the frequency component from an analog signal to a digital signal, and then analyzes the waveform of the signal of the frequency component, for each selected filter group.

By this configuration, the signal analyzer according to an aspect of the present invention can extract, from a signal under test inputted to the filter bank circuit, the frequency components corresponding to a plurality of (n/m) passbands that overlap each other and secure overlapping bands to avoid loss of the signal under test, and output them having unnecessary radio waves suppressed to the ADC. Thus it is possible to perform smooth and precise signal analysis for signals in all bands by using the filter groups that do not have moving parts without requiring long changeover time or complicated changeover control unlike mechanically switched filter banks.

In order to solve the above problem, the signal generator according to an aspect of the present invention includes a frequency conversion unit that inputs a test signal of an intermediate frequency band, outputted from a signal generation unit, to a mixer together with a local signal outputted from a local signal generator and converts into a signal of a frequency higher than the intermediate frequency band. The signal generator varies the frequency of the local signal according to a test target frequency for testing a device under test (DUT), and transmits a signal frequency-converted by the frequency conversion unit as the test signal for the DUT.

The signal generator further includes: the filter bank circuit described above, into which the frequency-converted signal is inputted, the filter bank circuit being provided after the frequency conversion unit, wherein the switch has a configuration that original output terminals function as input terminals and original input terminal functions as an output terminal; and a changeover control unit that controls the switch, into which signals outputted from the filter groups are inputted at the input terminals, so that a filter group including a filter circuit having a passband corresponding to a test target frequency is selected. A signal that has passed through the selected filter group is transmitted as the test signal from the output terminal.

By this configuration, the signal generator according to an aspect of the present invention can extract, from a frequency-converted signal inputted to the filter bank circuit, the frequency components corresponding to a plurality of (n/m) passbands that overlap each other keeping overlapping bands to avoid loss of a signal for test, and output them having unnecessary radio waves suppressed as the test signal. Thus it is possible to perform smooth test on the DUT with signals in all bands by using the filter groups that do not have moving parts without requiring long changeover time or complicated changeover control unlike mechanically switched filter banks.

In order to solve the above problems, a method for controlling a filter bank circuit according to an aspect of the present invention may be used in a spectrum analyzer, a signal analyzer, or a signal generator using the filter bank circuit described above. The method includes: a setting step of setting an analysis target frequency or a test target frequency; a determining step of determining a filter circuit to be selected from the filter groups based on the set analysis target frequency or test target frequency; a controlling step of controlling the switch so as to select a filter group to which the selected filter circuit belongs; and a step of extracting a frequency component that passes through the filter circuit determined in the determining step and included in the filter group switched by the controlling step, for measuring, analyzing, or transmitting a test signal.

By this configuration, the method for controlling a filter bank circuit according to an aspect of the present invention may be used for the filter bank circuit that is mounted on a spectrum analyzer, a signal analyzer, or a signal generator. In the method, the analysis target frequency range or test target frequency is associated with multiple (n×m) passbands that overlap each other. The method can extract a frequency component of each passband from the signal under test or test signal while suppressing unnecessary radio waves. By simple changeover control of the switch, it is possible to eliminate bands that cannot be used for signal measurement, signal analysis, or testing, and it is also possible to shorten the changeover time of the switch.

Effect of the Invention

The present invention can provide a filter bank circuit that can measure or test by using an electronically switchable switch and multiple filter groups to ensure guard bands within each filter group while changeover between filter groups is performed with simple changeover control to ensure overlap between adjacent filter bands in the entire filter groups. It is also possible to provide a spectrum analyzer, a signal analyzer, a signal generator using the filter bank circuit, and a method for controlling the filter bank circuit.

BRIEF EXPLANATION OF DRAWINGS

FIGS. 6A, 6B (collectively referred to as FIG. 6) are diagrams showing the operation timing during signal measurement of a spectrum analyzer using a filter bank circuit according to an embodiment of the present invention, in which FIG. 6A shows the changeover operation of a changeover switch, and FIG. 6B shows a local signal setting operation for one local signal generator.

FIGS. 9A, 9B (collectively referred to as FIG. 9) are diagrams showing the operation timing during signal measurement of a spectrum analyzer using a filter bank circuit according to modification 1 of the present invention, in which FIG. 9A shows the changeover operation of a changeover switch, and FIG. 9B shows a local signal setting operation for two local signal generators.

DETAILED DESCRIPTION OF EMBODIMENTS

Figure 1:
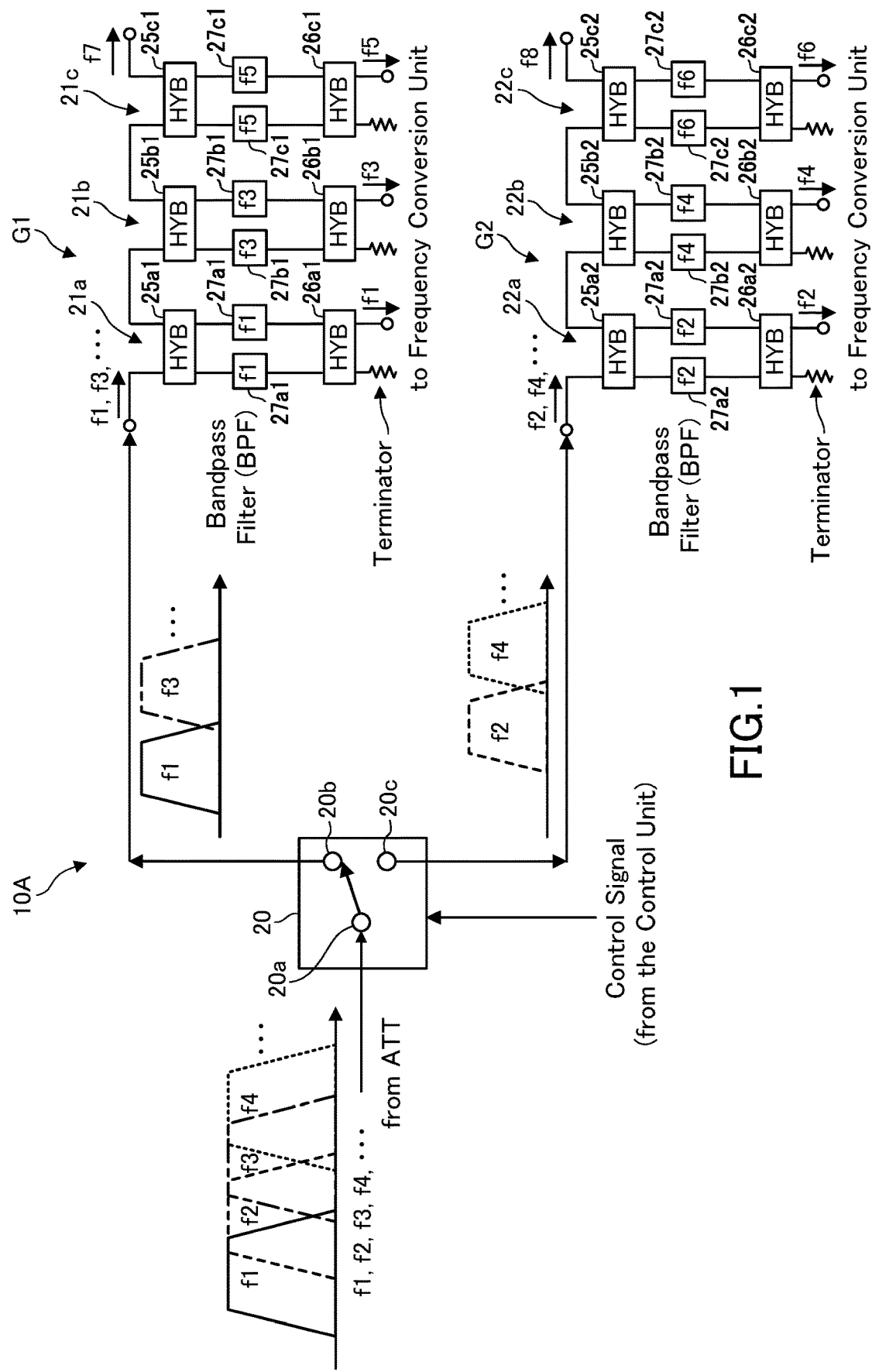
FIG. 1 is a configuration diagram of a filter bank circuit according to an embodiment of the present invention.

Hereinafter, a filter bank circuit according to the present invention, a spectrum analyzer, a signal analyzer, a signal generator using the same, and a method for controlling the filter bank circuit will be described.

Overview

A filter bank circuit 10 according to the present invention corresponds to filter bank circuits 10A, 10B, 10C, 10D, and 10E according to embodiments and modifications described later. The filter bank 10 is inputted with a signal of a predetermined frequency component as an input signal, extracts and outputs only signals of frequency components in a desired frequency band while suppressing unnecessary radio waves, that is, spurious waves. The filter bank circuit 10 is provided in a front-end circuit 101 of: a spectrum analyzer (see FIG. 4) that measures the distribution (spectrum) of frequency components contained in high-frequency signals; a signal analyzer (see FIG. 13) that analyzes the waveforms of frequency components contained in high-frequency signals; and a signal generator (see FIG. 14) that generates test signals for a reception sensitivity test of a device under test (DUT). The above-mentioned predetermined frequency component that can be handled by the filter bank circuit 10 according to the present invention is, for example, a sub-terahertz region of 100 GHz or more and less than 1 THz.

The filter bank circuit 10 according to the present invention includes a plurality of (for example, n) filter groups G1 to Gn, each of which has a plurality of (for example, m) filters (corresponding to filters 21a, 21b, 21c, 22a, 22b, 22c, 23a, 23b, and 23c in the embodiment below). The filter bank circuit 10 further includes a single-pole n-throw changeover switch 20 (see FIG. 1) for switching connections between one input terminal 20a and n output terminals 20b, 20c, 20d, . . . . An input signal (signal under test) is inputted to the input terminal 20a. The filter groups G1 to Gn are respectively connected to the n output terminals 20b, 20c, 20d, . . . . The filter bank circuit 10 is configured to selectively supply the signal under test to each filter group G1 to Gn through each output terminal 20b, 20c, 20d, . . . by controlling the changeover switch 20 so that the input terminal 20a is sequentially connected to the n output terminals 20b, 20c, 20d, . . . .

In each of the filter groups G1 to Gn, the filter bands (passbands) of the m filters are set to frequency bands (non-overlapping frequency bands) that can secure a guard band between adjacent bands. On the other hand, in two of the groups, the filters in the same order in each group are set to have passbands that overlap with each other.

According to the filter bank circuit 10 of the present invention having the above configuration, for example, when a filter group to which an input signal is inputted is sequentially switched from the filter group G1 to the filter groups G2, G3, G4, . . . , not only the overlap between adjacent passbands in the whole of the filter groups G1, G2, G3, G4, . . . can be maintained, but also guard bands can be ensured between adjacent filters in each of the filter groups G1, G2, G3, G4, . . . . In other words, the overlap between passbands of the filters in the alternating order of filters numbered 1 to n in each filter group G1, G2, G3, G4, . . . is maintained. Therefore, according to the configuration in which the filter bank circuit 10 according to the present invention is provided in the front-end circuit 101 of a spectrum analyzer, signal analyzer, or signal generator, switching control of the filter groups G2, G3, G4, . . . is easier and the switching time can be shortened, compared to the conventional device using a mechanically switched filter bank (see FIG. 17). Thus rapid and highly accurate measurement or testing of high frequency components with suppressed spurious waves can be realized.

Hereinafter, an embodiment of the filter bank circuit 10 (10A) according to the present invention (see FIGS. 1 to 3), an embodiment of a spectrum analyzer 1 using the filter bank circuit 10 (10A) (see FIGS. 4 to 7), an embodiment of the spectrum analyzer 1 using a filter bank circuit 10B according to modification 1 (see FIGS. 8 to 10), an embodiment of a filter bank circuit 10C according to modification 2 (see FIG. 11), an embodiment of a filter bank circuit 10D according to modification 3 (see FIG. 12), an embodiment of a signal analyzer 2 using the filter bank circuit 10A (see FIG. 13), and embodiments of a signal generator 3 in which the filter bank circuits 10A, 10B, 10C, and 10D are used as a filter bank circuit 10E (see FIGS. 14 to 16) will be described, in order.

In the following embodiments, for convenience, up to three filter groups (filter groups G1, G2, G3), up to three filters in each of the filter groups G1, G2, G3, and frequency bands from f1 to f12 are used. However, the number of these filter groups, the number of the filters within the filter group, and the number of the frequency bands can be arbitrary n, m, and n×(m+1), respectively, as described above.

Filter Bank Circuit 10A According to One Embodiment

FIG. 1 shows the configuration of a filter bank circuit 10A according to an embodiment of the present invention. As shown in FIG. 1, the filter bank circuit 10A according to the present embodiment has a changeover switch 20, a first filter group G1, and a second filter group G2.

The changeover switch 20 has one input terminal 20a and two output terminals 20b, 20c, and is a single-pole double-throw switch (Single-Pole/Double-Throw Switch: SPDT SW). The changeover switch 20 is configured such that the above-mentioned signal under test is inputted to the input terminal 20a. The output terminals 20b and 20c are connected to the first filter group G1 and the second filter group G2, respectively. By this, the changeover switch 20 outputs the signal under test to the first filter group G1 by performing changeover control so that the input terminal 20a and the output terminal 20b are connected, and the changeover switch 20 outputs the signal under test to the second filter group G2 by performing changeover control so that the input terminal 20a and the output terminal 20c are connected.

In the changeover switch 20, the first filter group G1 includes a plurality of filters 21a, 21b, and 21c whose passbands are frequency bands (hereinafter referred to as bands) f1, f3, f5, and f7, which do not overlap with each other, that is, guard bands can be secured for each other. In the description below, the filters 21a, 21b, and 21c may be collectively referred to as filters 21.

On the other hand, the second filter group G2 includes a plurality of filters 22a, 22b, and 22c whose passbands are bands f2, f4, f6, and f8, which do not overlap with each other and can ensure mutual guard bands. In the following description, the filters 22a, 22b, and 22c may be collectively referred to as filters 22. Each filter of the filters 21a, 21b, 21c, the filters 22a, 22b, 22c, and the filters 23a, 23b, 23c described below (see FIG. 11) constitutes a filter circuit of the present invention. Each of the filters 41a, 41b, 41c, 42a, 42b, 42c described below (see FIG. 12) also constitutes a filter circuit of the present invention.

In the first filter group G1, the filters 21a, 21b, and 21c have the same circuit structure although they have different filter characteristics. The filters 21a, 21b, and 21c have hybrids 25a1, 25b1, and 25c1 on the input side, and hybrids 26a1, 26b1, and 26c1 on the output side, respectively. The filter 21a has two BPFs 27a1, 27a1 connected in parallel between the hybrid 25a1 and the hybrid 26a1; the filter 21b has two BPFs 27b1, 27b1 connected in parallel between the hybrid 25b1 and the hybrid 26b1; and the filter 21c has two BPFs 27c1, 27c1 connected in parallel between the hybrid 25c1 and the hybrid 26c1. This means that the filters 21a, 21b, 21c (same as the filters 22a, 22b, 22c described later) are configured by filter banks using branch line couplers (BLC)(=hybrids 25a1, 25b1, 25c1, 26a1, 26b1, 26c1). Here, the BPF 27a1 of the filter 21a is set to have a passband of band f1, the BPF 27b1 of the filter 21b is set to have a passband of band f3, and the BPF 27c1 of the filter 21c is set to have a passband of band f5.

In the filter 21a, the signal under test is inputted to the hybrid 25a1 on the input side and the signal under test outputted from the hybrid 25a1 is inputted to the BPF 27a1. The BPF 27a1 passes the frequency component of band f1 and outputs the passed frequency component to the hybrid 26a1 on the output side. The passed signal is sent from the hybrid 26a1 to a frequency conversion unit (see frequency conversion unit 100 in FIG. 4). The other frequency components are inputted to the input-side hybrid 25b1 of the next-stage filter 21b via the input-side hybrid 25a1.

In the filter 21b, the signal under test is inputted to the hybrid 25b1 on the input side and the signal under test outputted from the hybrid 25b1 is inputted to the BPF 27b1. The BPF 27b1 passes the frequency component of band f3 and outputs the passed frequency component to the hybrid 26b1 on the output side. The passed signal is sent from the hybrid 26b1 to the frequency conversion unit. The other frequency components are inputted to the input side hybrid 25c1 of the next stage filter 21c via the input side hybrid 25b1.

In the filter 21c, the signal under test is inputted to the hybrid 25c1 on the input side and the signal under test outputted from the hybrid 25c1 is inputted to the BPF 27c1. The BPF 27c1 passes the frequency component of band f5 and outputs the passed frequency component to the hybrid 26c1 on the output side. The passed signal is sent from the hybrid 26c1 to the frequency conversion unit. The frequency component of band f7 is outputted to the frequency conversion unit via the hybrid 25c1 on the input side.

Also, in the second filter group G2, the filters 22a, 22b, and 22c have hybrids 25a2, 25b2, and 25c2 on the input side, and hybrids 26a2, 26b2, and 26c2 on the output side, respectively. The filter 22a has two BPFs 27a2, 27a2 connected in parallel between the hybrid 25a2 and the hybrid 26a2; the filter 22b has two BPFs 27b2, 27b2 connected in parallel between the hybrid 25b2 and the hybrid 26b2; and the filter 22c has two BPFs 27c2, 27c2 connected in parallel between the hybrid 25c2 and the hybrid 26c2. The filters 22a, 22b, 22c are also configured by filter banks using BLCs. Here, the BPF 27a2 of the filter 22a is set to have a passband of band f2, the BPF 27b2 of the filter 22b is set to have a passband of band f4, and the BPF 27c2 of the filter 22c is set to have a passband of band f6.

In the filter 22a, the signal under test is inputted to the hybrid 25a2 on the input side and the signal under test outputted from the hybrid 25a2 is inputted to the BPF 27a2. The BPF 27a2 passes the frequency component of band f2 and outputs the passed frequency component to the hybrid 26a2 on the output side. The passed signal is sent from the hybrid 26a2 to a frequency conversion unit. The other frequency components are inputted to the input-side hybrid 25b2 of the next-stage filter 22b via the input-side hybrid 25a2.

In the filter 22b, the signal under test is inputted to the hybrid 25b2 on the input side and the signal under test outputted from the hybrid 25b2 is inputted to the BPF 27b2. The BPF 27b2 passes the frequency component of band f4 and outputs the passed frequency component to the hybrid 26b2 on the output side. The passed signal is sent from the hybrid 26b2 to the frequency conversion unit. The other frequency components are inputted to the input side hybrid 25c2 of the next stage filter 22c via the input side hybrid 25b2.

In the filter 22c, the signal under test is inputted to the hybrid 25c2 on the input side and the signal under test outputted from the hybrid 25c2 is inputted to the BPF 27c2. The BPF 27c2 passes the frequency component of band f6 and outputs the passed frequency component to the hybrid 26c2 on the output side. The passed signal is sent from the hybrid 26c2 to the frequency conversion unit. The frequency component of band f8 is outputted to the frequency conversion unit via the hybrid 25c2 on the input side.

Figure 4:
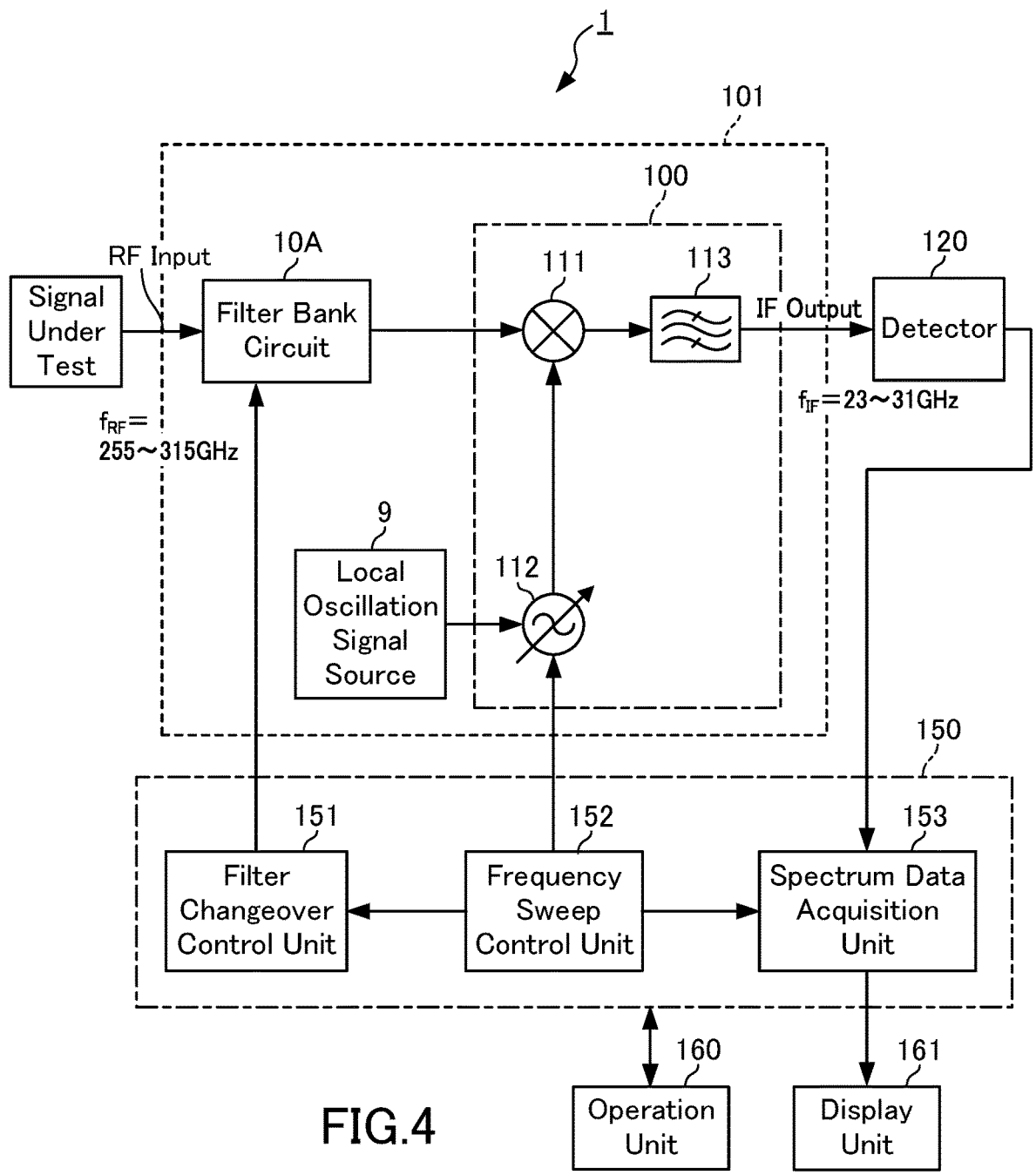
FIG. 4 is a diagram showing a general configuration of a spectrum analyzer using a filter bank circuit according to an embodiment of the present invention.

Thus, in the filter bank circuit 10A, the filters 21a, 21b, 21c constituting the first filter group G1 and the filters 22a, 22b, 22c constituting the second filter group G2 can extract each frequency component of bands f1, f3, f5, f7 and each frequency component of bands f2, f4, f6, f8 for each group from the signal under test inputted to the input terminal 20a of the changeover switch 2 and can output them to the frequency conversion unit (see frequency conversion unit 100 in FIG. 4).

Figure 2A:
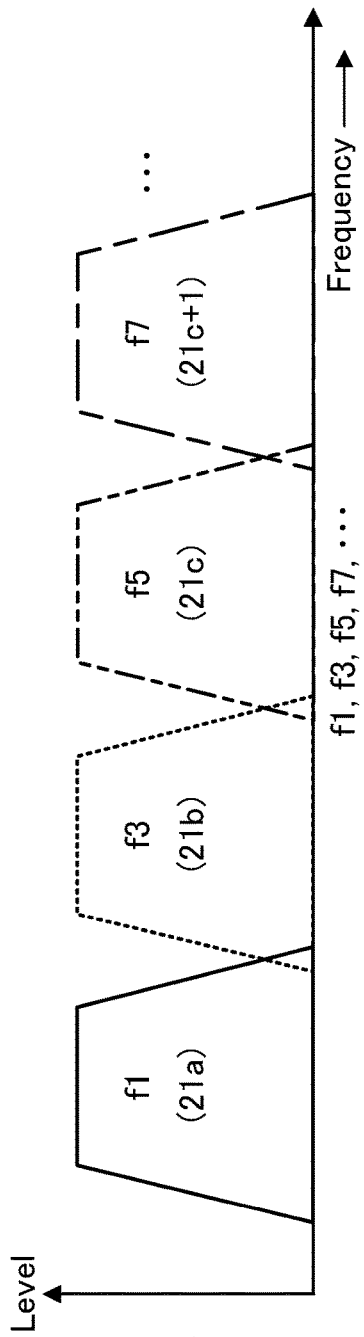
FIGS. 2A, 2B, 2C (collectively referred to as FIG. 2) are schematic diagrams showing the passbands of filters forming filter groups of a filter bank circuit according to an embodiment of the present invention.
Figure 2B:
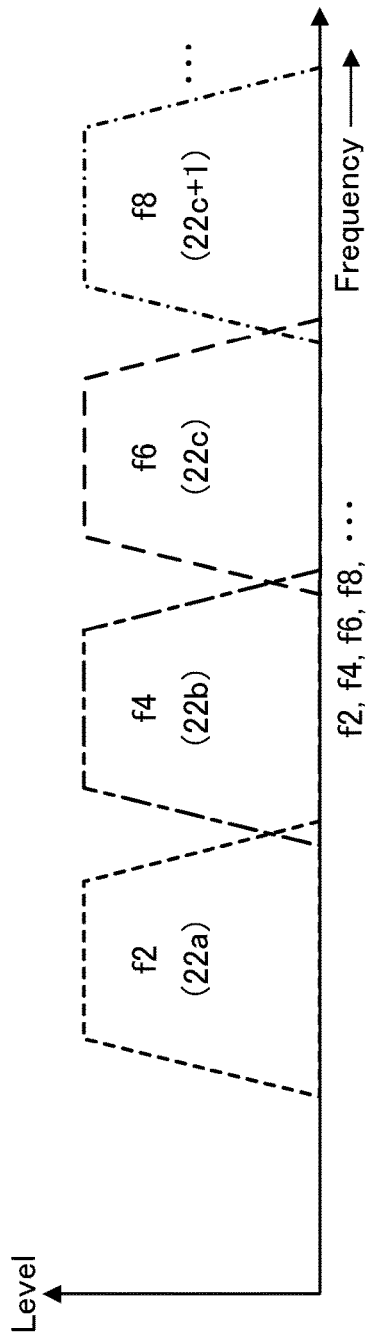
Figure 2C:
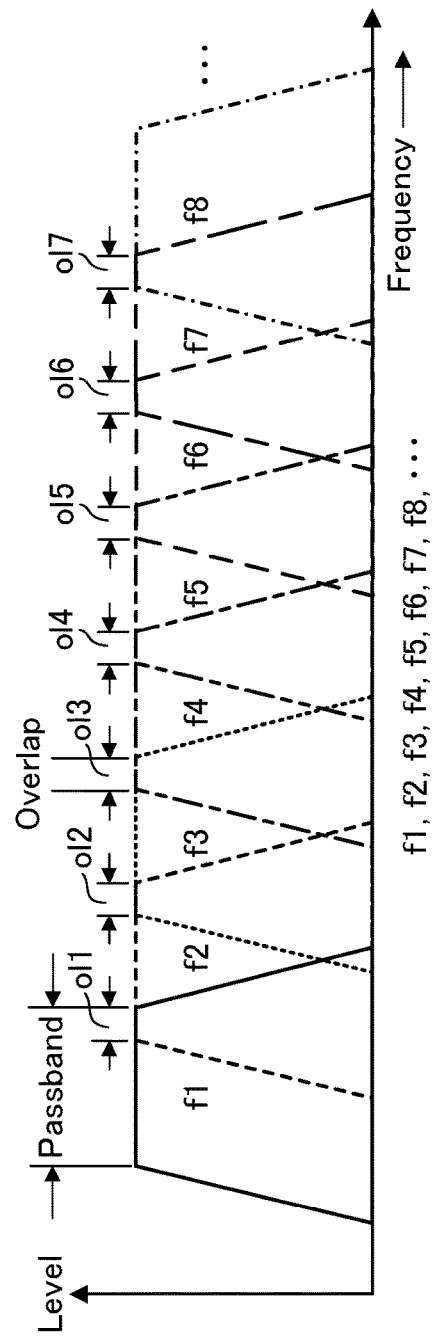

Next, the filter characteristics of the filters 21a, 21b, 21c constituting the first filter group G1 and the filters 22a, 22b, 22c constituting the second filter group G2 will be described. FIG. 2 is a diagram showing passbands of filters 21a, 21b, 21c and filters 22a, 22b, 22c divided into two groups (filter groups G1, G2) in the filter bank circuit 10A according to the present embodiment. FIG. 2A shows the passbands of the filters 21a, 21b, 21c forming the first filter group G1. FIG. 2B shows the passbands of the filters 22a, 22b, 22c forming the second filter group G2. FIG. 2C shows the passbands covered by both the first filter group G1 and the second filter group G2.

As shown in FIG. 2A, the filters 21a, 21b, 21c, and 21c+1 constituting the first filter group G1 have filter characteristics (passbands) to pass frequency bands (bands) f1, f3, f5, and f7 that do not overlap with each other. That is, adjacent bands of the bands f1, f3, f5, and f7 do not overlap with each other. As shown in FIG. 2B, the filters 22a, 22b, 22c, and 22c+1 constituting the second filter group G2 have passbands that pass frequency bands f2, f4, f6, and f8 that do not overlap with each other. That is, adjacent bands of the bands f2, f4, f6, and f8 do not overlap with each other. Here, for convenience, the filter 21c+1 refers to a filter portion of the filter 21c in FIG. 1 that passes a component of band f7, and similarly, the filter 22c+1 refers to a filter portion of the filter 22c that passes a component of band f8.

In FIGS. 2A and 2B, the frequency bands f1, f3, f5, f7, which can be passed by the filters 21a, 21b, 21c, and 21c+1, respectively, and the frequency bands f2, f4, f6, and f8, which can be passed by the filters 22a, 22b, 22c, and 22c+1, for example, have equal bandwidths on both the high and low frequency sides with the center frequency of each band in between.

Further, the passbands of the filters 21a, 21b, 21c, and 21c+1 constituting the first filter group G1 and the passbands of the filters 22a, 22b, 22c, and 22c+1 constituting the second filter group G2 will appear like FIG. 2C when these are shown together.

As shown in FIG. 2C, in the filter bank circuit 10A according to the present embodiment, the filters 21a and 22a are set to have passbands with an overlapping region ol1, the filters 22a and 21b are set to have passbands with an overlapping region ol2, the filters 21b and 22b are set to have passbands with an overlapping region ol3, the filters 22b and 21c are set to have passbands with an overlapping region ol4, the filters 21c and 22c are set to have passbands with an overlapping region ol5, the filters 22c and 21c+1 are set to have passbands with an overlapping region ol6, the filters 21c+1 and 22c+1 are set to have passbands with an overlapping region ol7, and so on.

Figure 3:
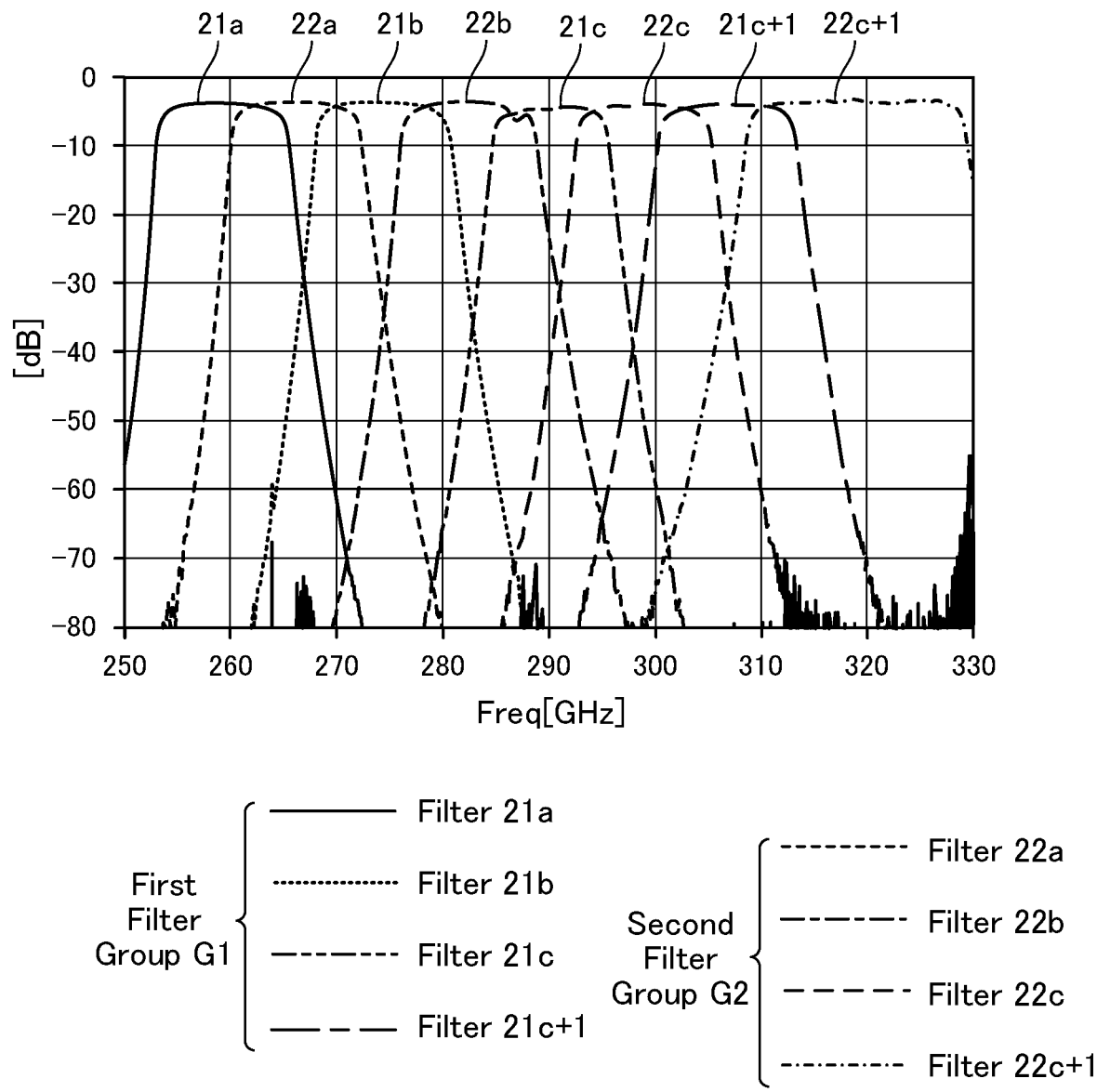
FIG. 3 is a graph showing frequency characteristics of filters forming filter groups of a filter bank circuit according to an embodiment of the present invention.

Here, assuming that the filter groups G1 and G2 are a first-stage group and a second-stage group, and the filters 21 and 22 are arranged in order from the left in FIG. 3 as the first to fourth filters, the first filter 21a of the first stage group and the first filter 22a of the second stage group, the first filter 22a of the second stage group and the second filter 21b of the first stage group, the second filter 21b of the first stage group and a second filter 22b of the second stage group, the second filter 22b in the second stage group and the third filter 21c in the first stage group, the third filter 21c in the first stage group and a third filter 22c in the second stage group, the third filter 22c of the second stage group and the fourth filter 21c+1 of the first stage group, and the fourth filter 21c+1 in the first stage group and the fourth filter 22c+1 in the second stage group are configured that the passbands mutually overlap at the overlapping regions ol1, ol2, ol3, ol4, ol5, ol6, and ol7, respectively.

Table 1 below shows an example of the specifications including the passbands of the filters 21a, 21b, 21c, 21c+1 and the filters 22a, 22b, 22c, 22c+1 described in FIGS. 2A and 2B. Further, Table 2 below shows an example of specifications regarding the overlapping bands between the filters 21a and 22a, between the filters 22a and 21b, between the filters 21b and 22b, between the filters 22b and 21c, between the filters 21c and 22c, between the filters 22c and 21c+1, and between the filters 21c+1 and 22c+1 described in FIG. 2C.

TABLE 1

Unit: GHz

| | Passband | | | |
|---|---|---|---|---|
| | Lower Limit Frequency | Upper Limit Frequency | Center Frequency | Bandwidth |
| 21a | 207.5 | 232.5 | 220 | 25 |
| 21b | 237.5 | 262.5 | 250 | 25 |
| 21c | 267.5 | 292.5 | 280 | 25 |
| 21c + 1 | 297.5 | 322.5 | 310 | 25 |
| 22a | 222.5 | 247.5 | 235 | 25 |
| 22b | 252.5 | 277.5 | 265 | 25 |
| 22c | 282.5 | 307.5 | 295 | 25 |
| 22c + 1 | 312.5 | 337.5 | 325 | 25 |

TABLE 2

Unit: GHz

| | Overlapping region | | Bandwidth |
|---|---|---|---|
| ol1 | 222.5 | 232.5 | 10 |
| ol2 | 237.5 | 247.5 | 10 |
| ol3 | 252.5 | 262.5 | 10 |
| ol4 | 267.5 | 277.5 | 10 |
| ol5 | 282.5 | 292.5 | 10 |
| ol6 | 297.5 | 307.5 | 10 |
| ol7 | 312.5 | 322.5 | 10 |

A specific example of the frequency characteristics of each filter 21a, 21b, 21c, 21c+1, 22a, 22b, 22c, 22c+1 constituting the first filter group G1 and second filter group G2 shown in FIG. 2 is shown in FIG. 3. In FIG. 3, the range from 255 GHz to 325 GHz is divided into eight bands, and FIG. 3 illustrates the passage characteristics when these eight bands are sequentially assigned to the filter 21a of the first filter group G1, the filter 22a of the second filter group G2, the filter 21b of the first filter group G1, the filter 22b of the second filter group G2, the filter 21c of the first filter group G1, the filter 22c of the second filter group G2, the filter 21c+1 of first filter group G1, and the filter 22c+1 of second filter group G2.

As shown in FIG. 3, the filter 21a has a passband of, for example, 253-264 GHz and a center frequency of 258 GHz, and overlaps with the filter 22a in the frequency band of, for example, 260-264 GHz. The filter 22a has a passband of, for example, 260-272 GHz, and a center frequency of 267 GHZ, and overlaps with the filter 21a under the above-mentioned conditions, and overlaps with the filter 21b, for example, in the frequency band of 268-272 GHz. The filter 21b has a passband of, for example, 268-281 GHz and a center frequency of 274 GHZ, and overlaps with the filter 22a under the above-mentioned conditions, and overlaps with the filter 22b, for example, in the frequency band of 276-281 GHz. The filter 22b has a passband of, for example, 276-288 GHz and a center frequency of 282 GHz, and overlaps with the filter 21b under the above-mentioned conditions, and overlaps with the filter 21c, for example, in the frequency band of 285-288 GHz.

Further, the filter 21c has a passband of, for example, 285-295 GHz and a center frequency of 290 GHz, overlaps with the filter 22b under the above-mentioned conditions, and overlaps with the filter 22c, for example, in the frequency band of 292-295 GHz. The filter 22c has a passband of 292-305 GHz and a center frequency of 298 GHz, overlaps with the filter 21c under the above-mentioned conditions, and overlaps with the filter 21c+1, for example, in the frequency band of 300-305 GHz. The filter 21c+1 has a passband of, for example, 300-312 GHz and a center frequency is 306 GHz, overlaps with the filter 22c under the above-mentioned conditions, and overlaps with the filter 22c+1, for example, in the frequency band of 308-313 GHz. The filter 22c+1 has a passband exceeding 308 GHz and a center frequency of 320 GHz, and overlaps with the filter 21c+1 under the above-mentioned conditions.

As stated above, the filter bank circuit 10A may be configured to include the filters 21a, 21b, 21c, and 21c+1 constituting the first filter group G1 having the passband characteristics shown in FIG. 3, and the filters 22a, 22b, 22c, and 22c+1 constituting the second filter group G2 having the passband characteristics shown in FIG. 3 having the passband characteristics shown in FIG. 3. As shown in FIG. 2C, in the frequency bands from the passband of the filter 21a in the first filter group G1 to the passband of the filter 22c+1 in the second filter group G2, it is possible to cover measurements targeting all of these frequency bands by controlling the switch 20 because the adjacent bands of the bands f1, f2, f3, f4, f5, f6, f7, and f8 partially overlap with each other. For example, it is possible to eliminate frequency bands in which spectrum characteristics cannot be measured in the millimeter wave band.

Spectrum Analyzer 1 Using Filter Bank Circuit 10A

FIG. 4 is a diagram showing a general configuration of a spectrum analyzer 1 using filter bank circuit 10A described above. The spectrum analyzer 1 is assumed to have a millimeter wave band signal analysis function.

This spectrum analyzer 1 has a frequency conversion unit 100, a detector 120, a control unit 150, an operation unit 160, and a display unit 161, and also has the above-mentioned filter bank circuit 10A at a stage before the frequency conversion unit 100.

The frequency conversion unit 100 includes a mixer 111, a local signal generator 112, and a filter 113.

The mixer 111 is a functional unit serving as a frequency conversion means that converts a signal under test of RF frequency into a signal of an intermediate frequency (IF) and outputs the converted signal, by mixing the signals of RF frequency components outputted from the filter bank circuit 10A with a local signal outputted from the local signal generator 112. In the signals outputted from the filter bank circuit 10A, spurious waves are suppressed.

The local signal generator 112 generates the local signal to be sent to the mixer 111 based on a local oscillation signal (reference signal) inputted from the local oscillation signal source 9.

The filter 113 is a filter function unit that inputs the IF signal frequency-converted by the mixer 111, passes only a signal of a predetermined frequency component in a band from the inputted IF signal, and outputs the passed signal to the detector 120.

The detector 120 is a processing circuit that detects the strength of the signal of each band (IF) that passes through the filter 113.

The control unit 150 has a filter changeover control unit 151, a frequency sweep control unit 152, and a spectrum data acquisition unit 153 in addition to a control function for controlling the entire spectrum analyzer 1 including the filter bank circuit 10A.

The filter changeover control unit 151 electronically switches and controls the connection between one pole (input terminal) and two throws (output terminals) of the single-pole double-throw changeover switch 20, for example, provided in the filter bank circuit 10A (see FIG. 1). The filter changeover control unit 151 constitutes changeover control means of the present invention.

The frequency sweep control unit 152 is a functional unit that executes frequency sweep control, specifically changes the frequency of the local signal outputted from the local signal generator 112 to the mixer 111 within a specified frequency range based on the local oscillation signal (reference signal) inputted from the local oscillation signal source 9. The frequency sweep control unit 152 constitutes local frequency setting means of the present invention.

The spectrum data acquisition unit 153 is a unit that acquires spectrum data including the strength of the signal component of a desired frequency band, detected by the detector 120, within the analysis target frequency range, and performs display control on the display unit 161 and the like.

The operation unit 160 has input means such as various keys, switches, buttons, and the like, and is operated by a user when making various settings related to measurement of the signal under test. The display unit 161 is a functional unit that is configured with, for example, a liquid crystal display, and displays a setting screen, measurement results, and the like related to measurement of the signal under test.

In the spectrum analyzer 1 shown in FIG. 4, a signal under test (input signal) in the millimeter wave band is given to the mixer 111 of the frequency conversion unit 100 through the filter bank circuit 10A, and the signal from the filter bank circuit 10A is mixed with a local signal outputted from the local signal generator 112. The filter 113 extracts a signal in a predetermined intermediate frequency (IF) band from the mixed output signal. The frequency of the local signal is swept and varied by the frequency sweep control unit 152 of the control unit 150 in accordance with a desired frequency range to be analyzed, the signal component in the desired frequency range to be analyzed is extracted over time as a signal of the intermediate frequency band, and its intensity is detected by the detector 120. In order to simplify the explanation, here is an example in which the frequency conversion process (heterodyne conversion) of the frequency conversion unit 100 is performed only once, but it is possible to accurately analyze high frequency signals such as millimeter wave band by performing the frequency conversion processing multiple times to convert into an intermediate frequency band that can be digitally processed.

In the control unit 150, the spectrum data acquisition unit 153 stores, as spectrum data, the signal strength detected by the detector 120 for each analysis target frequency, for example, according to the analysis target frequency range set by the operation unit 160, and displays the spectrum data on the display unit 161.

At this time, the filter changeover control unit 151 controls the changeover switch 20 in the filter bank circuit 10A according to the analysis target frequency, and performs changeover control to switch to one filter group side that includes the filters 21 or 22 having passbands, in which the analysis target frequency is included, between the filter groups G1 and G2.

The frequency sweep control unit 152 performs frequency sweep control of the local frequency based on the passbands of the filters 21 or the filters 22 selected according to the analysis target frequency at that time, in accordance with the changeover control of the filter groups G1 and G1 by the filter changeover control unit 151.

In the configuration of the spectrum analyzer 1 shown in FIG. 4, the signal under test (RF Input) as an input signal of the front-end circuit 101 is, for example, a signal (fRF) in the frequency range of 255 to 315 GHZ, and an output signal (IF Output) is, for example, a signal (fIF) in the frequency range of 23 to 31 GHz. This means that the spectrum analyzer 1 according to the present embodiment takes in a reception signal received from, for example, a mobile phone (5G, LTE, XG-PHS, W-CDMA, CDMA2000, GSM, and the like) or various wireless communications (WLAN, Bluetooth, GPS, ISDBT, and the like) as an input signal (RF input), spurious waves are suppressed by the filter bank circuit 10 in the front-end circuit 101, and the spectrum characteristics of each desired frequency component can be measured.

In FIG. 4, the control unit 150 may be a control unit of a main body of the spectrum analyzer 1, or may be configured with a separate device such as a PC (personal computer).

In the spectrum analyzer 1 configured in this way, since the filter group G1 and the filter group G2 are switched electronically by controlling the changeover switch 20, the changeover time is short and the lifespan is long in comparison with a mechanical changeover configuration. Since the plurality of filters 21 and 22 that constitute the filter groups G1 and G2 have passbands that do not overlap within a group but overlap between groups, guard bands between bands can be maintained by using a plurality of filter groups (abbreviated as G) and performing changeover thereof. Thus, it is possible to maintain overlap between the adjacent passbands of the filters in the entire filter groups G. By this, it is possible to perform the smooth spectrum measurements in all bands by using multiple filter groups G without moving parts, without the need for long changeover time or complicated changeover control unlike mechanically switched filter banks.

Figure 5:
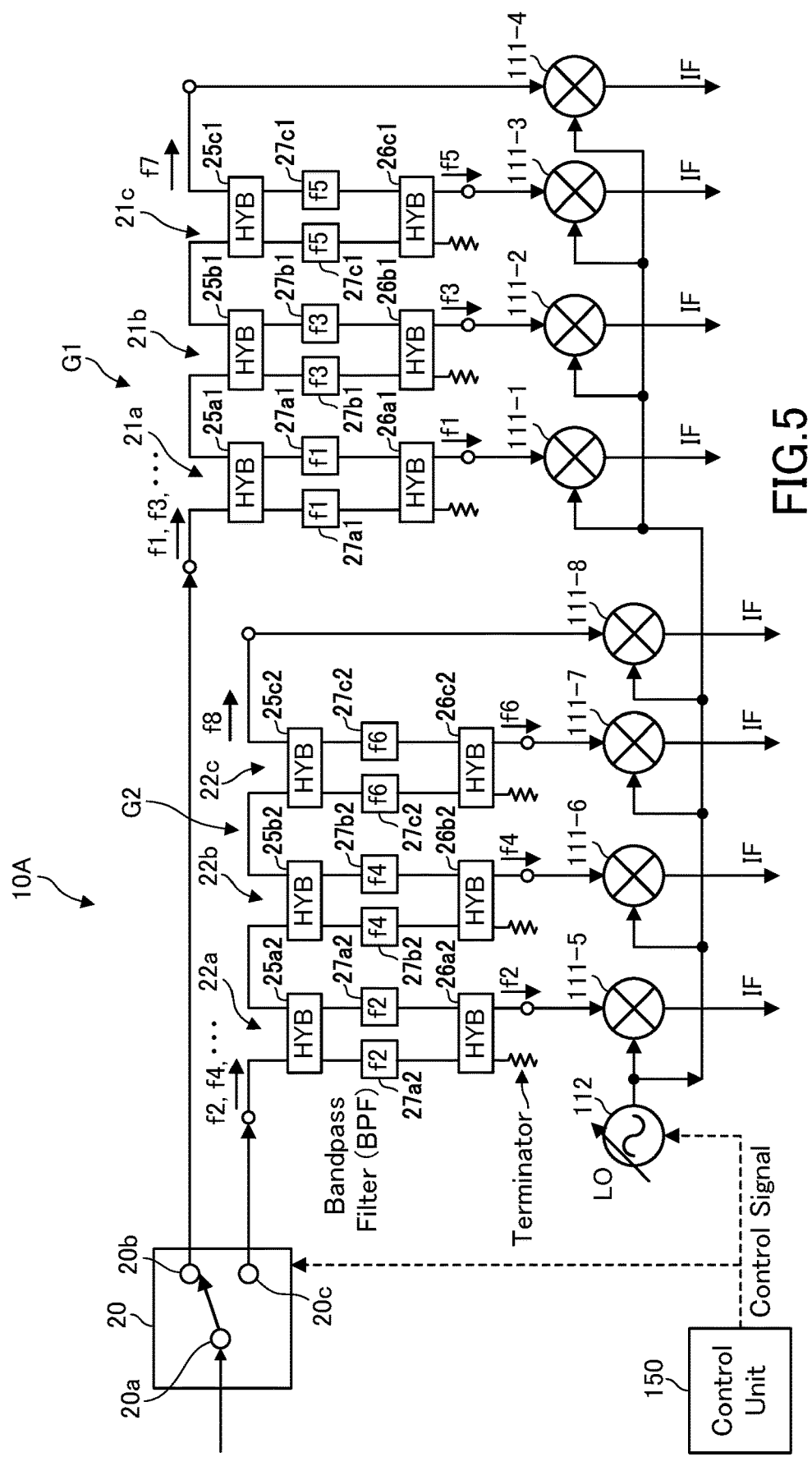
FIG. 5 is a diagram showing the main part configuration of a filter bank circuit including a local signal supply path in a spectrum analyzer using a filter bank circuit according to an embodiment of the present invention.

The configuration of the spectrum analyzer 1 will be explained in more detail. FIG. 5 shows a configuration of a main part of the filter bank circuit 10A, which takes into account the local signal supply path, among the possible configurations of the spectrum analyzer 1 using the filter bank circuit 10A shown in FIG. 4.

In the spectrum analyzer 1 (see FIG. 4) that is provided with the filter bank circuit 10A in the front-end circuit 101, the frequency components that have passed through the filter 21a, 21b, and 21c of the first filter group G1, or the filters 22a, 22b, and 22c of the second filter group G2 in the filter bank circuit 10A are then inputted to the mixer 111 and frequency-converted to the IF frequency.

In order to achieve this frequency conversion, in the spectrum analyzer 1 according to the present embodiment, the filter bank circuit 10A is provided with, for example, one local signal generator 112 and mixers 111-1, 111-2, 111-3, 111-4, 111-5, 111-6, 111-7, 111-8 corresponding to bands f1, f2, f3, f4, f5, f6, f7, f8 respectively passing through the filter bank circuit 10A, for example, as shown in FIG. 5. During the signal measurement by the spectrum analyzer 1, in the filter bank circuit 10A, the frequency components that have passed through the first filter group G1 or the second filter group G2 and the local signal generated by the local signal generator 112 according to the frequency components to be passed through the filter bank circuit 10A are mixed by the mixers 111-1, 111-2, 111-3, 111-4, 111-5, 111-6, 111-7, and 111-8 and are sent out to the subsequent detector 120 as a measurement signal frequency-converted to an intermediate frequency.

The filter changeover control unit 151 performs changeover control of the changeover switch 20 of the filter bank circuit 10A, and the frequency sweep control unit 152 performs frequency sweep control in order to generate a local signal corresponding to the frequency components that have passed through the first filter group G1 or the second filter group G2.

FIG. 6 is a timing chart showing the operation of the filter bank circuit 10A during signal measurement by the spectrum analyzer 1 according to the present embodiment, in which FIG. 6A shows the changeover operation of the changeover switch 20 ("SPDT SW control"), FIG. 6B shows the local signal setting operation ("LO frequency setting") for the local signal generator 112. As shown in FIG. 6A, regarding the changeover control of the changeover switch 20, the filter changeover control unit 151 performs changeover from the first filter group G1 (f1, f3, f5, f7 route) to the second filter group G2 (f2, f4, f6, f8 route) at the timing indicated by the dotted vertical line and changeover from the second filter group G2 to the first filter group G1 alternately. The control unit 150 causes the frequency sweep control unit 152 to set a local signal to the local signal generator 112 ("LO setting") in accordance with the alternating changeover between the first filter group G1 and the second filter group G2, and then performs frequency measurements (such as "f1 measurement") based on the settings, for example, so that the pattern is repeatedly performed in the order of bands f1, f2, f3, . . . .

When the measurement operation control based on the operation timing shown in FIG. 6A is viewed from the viewpoint of the local signal setting operation for the local signal generator 112, it becomes as shown in FIG. 6B. In this case, since there is only one local signal generator 112, the operation timing is as follows: the local frequency is set ("LO setting"), and then the band f1 is measured ("f1 measurement"), and then the local frequency is set ("LO setting"), and then the band f2 is measured ("f2 measurement) and so on. Such operations are carried out sequentially (for example, in the order of f1, f2, f3, f4, etc.) for desired frequencies.

By control of "SPDT SW control" and "LO frequency setting" shown in FIG. 6, the operation of measuring the corresponding frequency component after LO setting is repeated. No passband overlap occurs in each route of the f1, f3, f5, f7 route and f2, f4, f6, f8 route. It is possible to perform measurements while maintaining passband overlap between f1, f3, f5, f7 route and f2, f4, f6, f8 route.

Next, the signal measurement control operation will be explained with reference to the flowchart shown in FIG. 7 in the spectrum analyzer 1 according to the present embodiment, based on the flow of the changeover control of the changeover switch 20 (see FIG. 6A) and the LO frequency setting control (see FIG. 6B) described above.

In this example, the spectrum analyzer 1 performs the measurement operation, for example, to input a signal under test in the millimeter wave band (255 to 315 GHz band), extract, from the signal under test, the signals of predetermined desired bands, for example, bands f1, f2, f3, f4, f5, f6, f7, f8 by the filters 21*a*, 21*b*, 21*c*, 22*a*, 22*b*, 22*c* in the filter bank circuit 10A, convert the extracted frequency components to IF frequencies, input the frequency-converted components to the detector 120, measure the frequency spectrum, and display the measurement results on the display unit 161.

In order to perform the above measurement operation, the user performs an operation to set the sweep frequency range (analysis target frequency range) of the spectrum analyzer 1, for example, on the operation unit 160 (step S1). Examples of the parameters set here include, for example, the center frequency and sweep frequency span, the start frequency and stop frequency, and the start frequency and sweep frequency span.

Next, the control unit 150 calculates or determines the filters to be selected (in this example, filters 21*a*, 21*b*, 21*c* (hereinafter referred to as filters 21), 22*a*, 22*b*, 22*c* (hereinafter referred to as filters 22)) and LO settings (local frequency setting conditions) based on the sweep frequency range set in step S1 (step S2). Here, when a plurality of filters are selected, the LO setting is calculated or determined according to each of the selected filters 21 and 22.

Subsequently, the control unit 150 determines whether the number of the selected filters 21 and filters 22 is singular or plural (step S3).

If it is determined that the number of the filters 21, 22 to be selected is singular ("single" in step S3), the control unit 150 sets the path of the changeover switch 20 corresponding to the path of the selected filters 21, 22, and at the same time, sets the local frequency (LO frequency) (step S41).

Next, in the control unit 150, the filter changeover control unit 151 performs changeover control of the changeover switch 20 between the first filter group G1 and the second filter group G2 based on the path setting in step S41. In accordance with this operation, the frequency sweep control unit 152 controls the frequency sweep of the local signal generator 112 based on the LO setting in step S41, and the measurement using the selected filters 21, 22 is performed (step S42). If the number of the selected filters 21, 22 is singular, the above measurement operation is finished, and the control unit 150 determines whether a continuous measurement mode is set in step S10, and if the continuous measurement mode is not set, the process is finished.

On the other hand, if it is determined that the number of the filters 21 and 22 to be selected is plural ("plural" in step S3), the control unit 150 performs the processing from step S4 onwards. First, the control unit 150 sets the LO frequency corresponding to the first selected filter (for example, one of the filters 21) in the local signal generator 112 (step S4).

Next, the control unit 150 sets the path of the changeover switch 20 corresponding to the first selected one of the filters 21, and performs measurement with the first selected one of the filters 21 (step S5).

After that, the control unit 150 waits for the measurement to end in step S5, and then sets the LO frequency corresponding to a second selected one of the filters 22 in the local signal generator 112 (step S6).

Subsequently, the control unit 150 sets the path of the changeover switch 20 corresponding to the second selected one of the filters 22, and performs measurement with the second selected one of the filters 22 (step S7).

After the measurement in step S7 is completed, the control unit 150 checks whether there is a filter to be selected next from the filters 21 (step S8).

Here, if it is determined that there are no filters to be selected next from the filters 21, 22 (NO in step S8), the control unit 150 advances the process to step S10.

On the other hand, if it is determined that there is a filter to be selected next from the filters 21, 22, . . . (YES in step S8), the control unit 150 repeatedly performs the processing corresponding to steps S6 and S7 (the processing performed by replacing the second filter with the n-th filter) for the next selected one of the filters 21, 22, . . . until there are no filters left to be selected next (step S9). If it is determined that there is no filter to be selected next from the filters 21, 22, . . . during this repeatedly executed process (NO in step S8), the control unit 150 advances the process to step S10.

In step S10, the control unit 150 checks whether a continuous measurement mode is set. If the continuous measurement mode is set (YES in step S10), the process returns to step S3 and continues the processing from step S3 onwards. On the other hand, if the continuous measurement mode is not set (NO in step S10), the control unit 150 ends the series of measurement operation controls described above.

Figure 7:
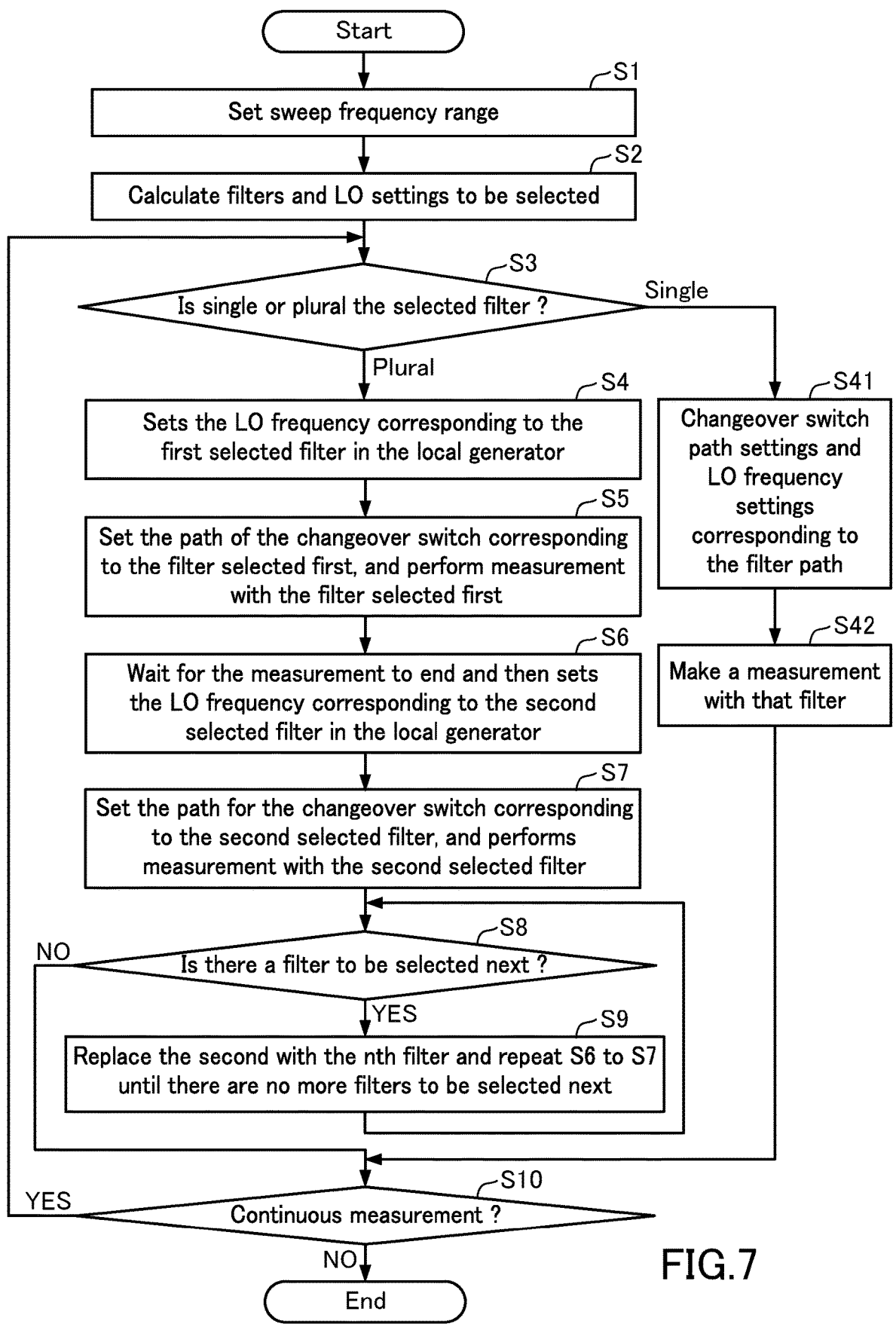
FIG. 7 is a flowchart showing a signal measurement control operation in a spectrum analyzer using a filter bank circuit according to an embodiment of the present invention.

In the series of measurement operations shown in FIG. 7, a first selected one of the filters 21 (step S5), a second selected one of the filters 22 (step S7), a next selected one of the filters 21, and ones of the filters 22 and 21 (step S9) that are sequentially selected thereafter are, for example, as shown in FIG. 2C, the first filter 21*a* of the first stage group, the first filter 22*a* of the second stage group, 2nd filter 21*b* of 1st stage group, 2nd filter 22*b* of 2nd stage group, 3rd filter 21*c* of 1st stage group, 3rd filter 22*c* of 2nd stage group, the fourth filter 21*c*+1 of the first stage group, and the fourth filter 22*c*+1 of the second stage group, respectively, and so on.

In this way, the spectrum analyzer 1 according to the present embodiment electronically controls the changeover switch 20 without using a mechanically switched filter bank (see FIG. 17), so that signal measurements that do not cause non-overlapping bands can be realized in a short time and with high precision, thereby making it possible to support wide-band measurements such as millimeter wave band measurements.

Modification 1

Figure 8:
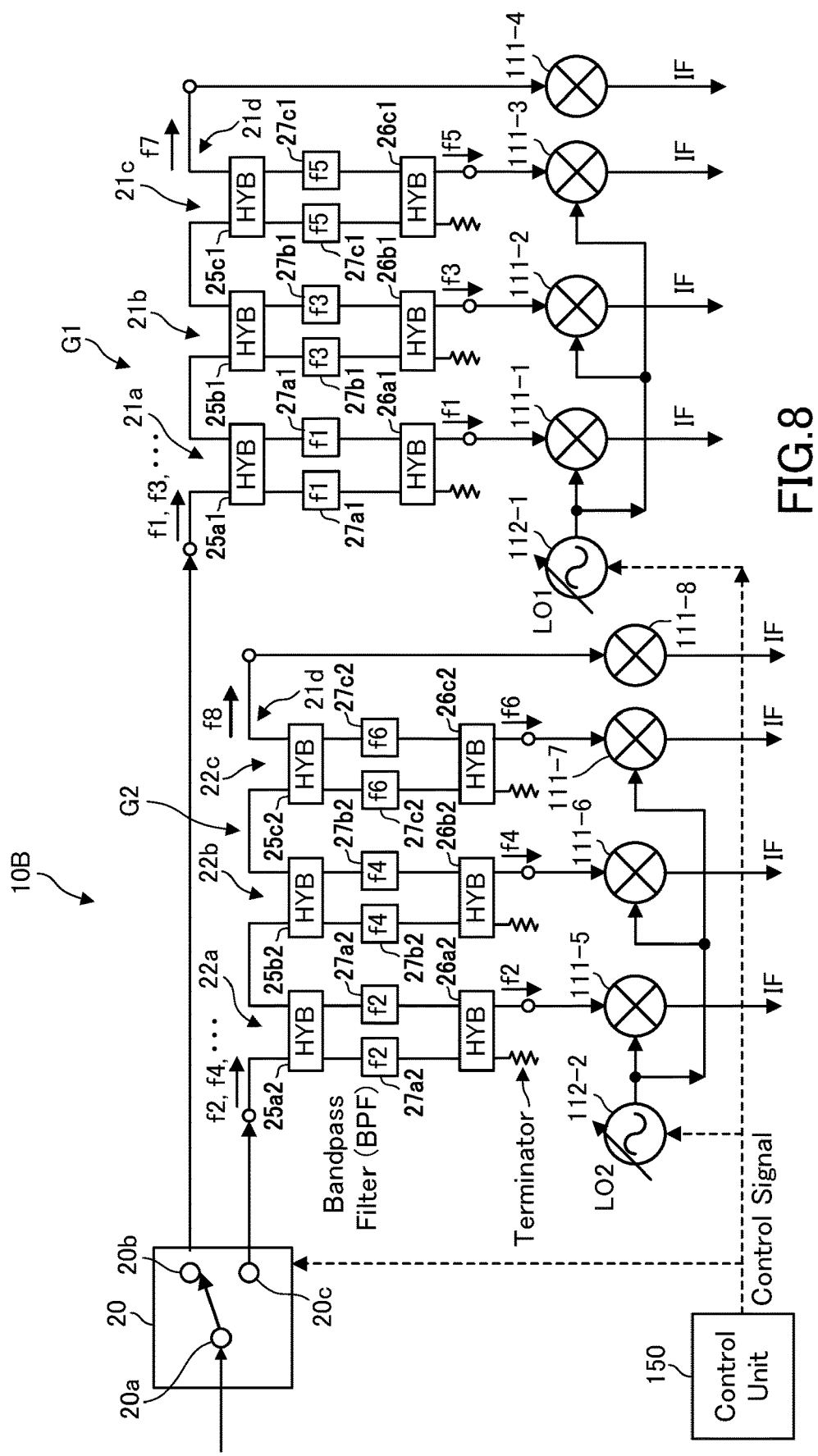
FIG. 8 is a block diagram showing a configuration including a main part of a local signal supply path of a filter bank circuit according to modification 1 of the present invention.

FIG. 8 shows the configuration including a main part of a local signal supply path of a filter bank circuit 10B according to modification 1 of the spectrum analyzer 1 according to the present embodiment. In FIG. 8, the same reference numerals are given to the same parts as those of the filter bank circuit 10A shown in FIG. 5. As shown in FIG. 8, the filter bank circuit 10B according to modification 1 has two local generators, which are a local signal generator (LO1) 112-1 corresponding to the first filter group G1 and a local signal generator (LO2) 112-2 corresponding to the second filter group G2. Other configurations are the same as those of the filter bank circuit 10A according to the first embodiment as described above. In order to drive and control the filter bank circuit 10B according to modification 1, the frequency sweep control unit 152 in the control unit 150 (see FIG. 4) has a functional configuration that can individually perform frequency sweep control on the local signal generator 112-1 and the local signal generator 112-2 provided in the filter bank circuit 10B.

FIG. 9 is a timing chart showing the operation of the filter bank circuit 10B during the signal measurement by the spectrum analyzer 1 that employs the filter bank circuit 10B according to modification 1. FIG. 9A shows the changeover operation of the changeover switch 20 ("SPDT SW control"), and FIG. 9B shows the setting operation of local signals for the local signal generators 112-1 and 112-2 ("LO1, LO2 frequency setting").

As shown in FIG. 9A, regarding the changeover control of the changeover switch 20, the filter changeover control unit 151 performs changeover from the first filter group G1 (f1, f3, f5, f7 route) to the second filter group G2 (f2, f4, f6, f8 route) at the timing indicated by the two-dot chain vertical line, and changeover from the second filter group G2 (f2, f4, f6, f8 route) to the first filter group G1 (f1, f3, f5, f7 route) at the timing indicated by the dotted line. In the control unit 150, as the first filter group G1 and the second filter group G2 are alternately switched, the frequency component that passes through the desired filter of the filters 21 in the first filter group G1 and the frequency component that passes through the desired filter of the filters 22 in the second filter group G1 are controlled to be alternately measured (for example, the measurement is performed in the order of bands f1, f2, f3, . . . ).

When viewing the measurement operation control based on the operation timing shown in FIG. 9A from the perspective of the setting operation of the local frequencies LO1 and LO2 for the local signal generators 112-1 and 112-2, it appears to be as shown in FIG. 9B. In this case, since there are two local signal generators 112-1 and 112-2, the operation timing is as follows: during the measurement of each frequency component corresponding to the f1, f3, f5, f7 route in the first filter group G1, the local frequency LO2 corresponding to f2, f4, f6, f8 route in the second filter group G2 is set for the local signal generator 112-2, and during the measurement of each frequency component corresponding to the f2, f4, f6, f8 route in the second filter group G2, the local frequency LO1 corresponding to f1, f3, f5, f7 route in the first filter group G1 is set for the local signal generator 112-1.

By controlling of the "SPDT SW control" and "LO1, LO2 frequency setting" shown in FIG. 9, there is no setting of LO1 or LO2 between the measurement of, for example, band f1 in the first filter group G1 and the measurement of band f2, for example, in the second filter group G2, so that, compared to the case of using one local signal generator 112 shown in FIG. 6, there is no time to set LO1 or LO2 between measurements at frequencies in different routes. By this, in the configuration of the spectrum analyzer 1 using the filter bank circuit 10B according to modification 2, unnecessary waiting time related to LO settings that do not contribute to measurement can be eliminated, so that the measurement in which there is no passband overlap within the individual route of f1, f3, f5, f7 route and f2, f4, f6, f8 route can be realized in a shorter time compared to the configuration example shown in FIG. 6 while adjacent passbands between f1, f3, f5, f7 route and f2, f4, f6, f8 route are overlapped.

Figure 10:
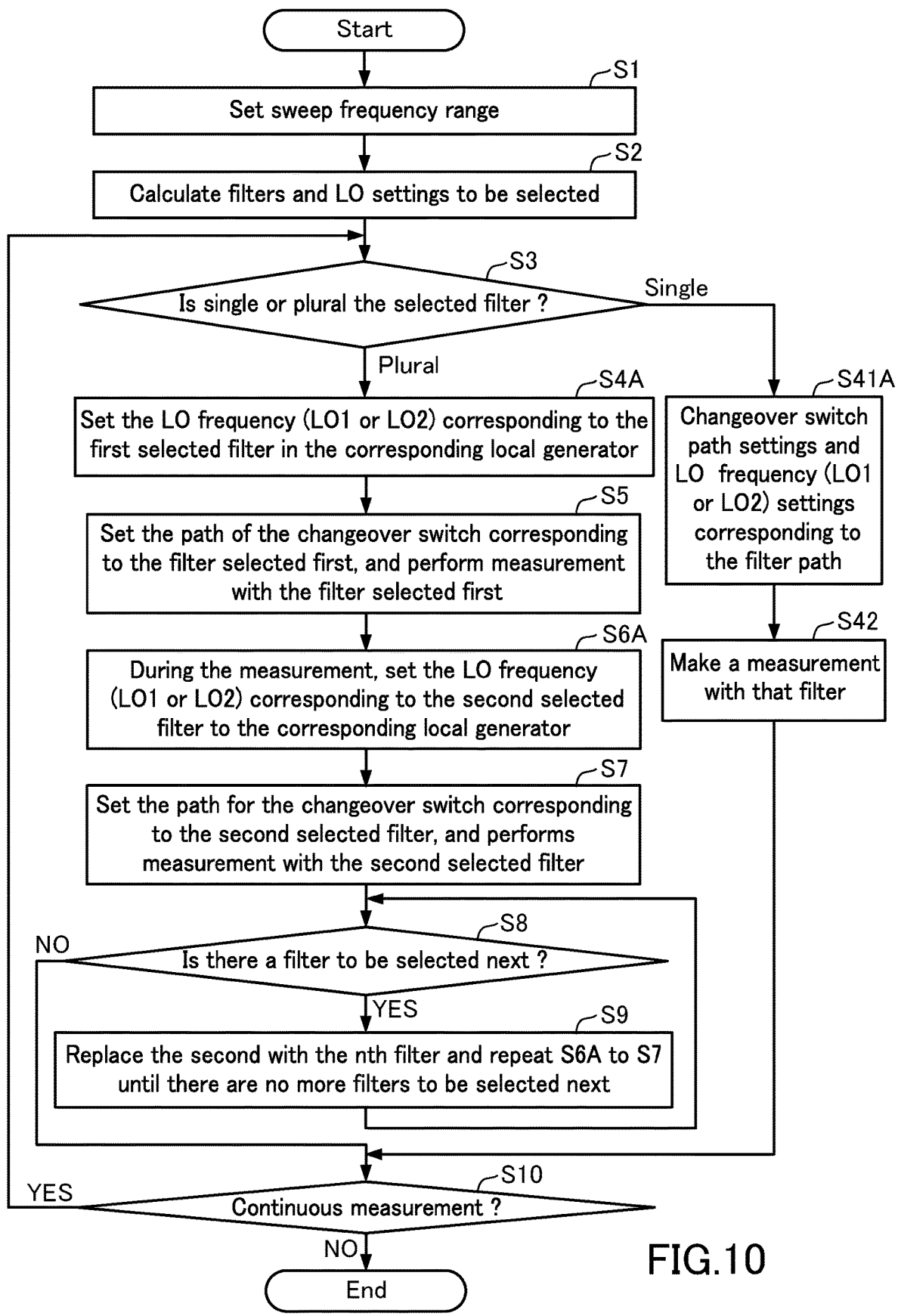
FIG. 10 is a flowchart showing a signal measurement control operation in a spectrum analyzer using a filter bank circuit according to modification 1 of the present invention.

The signal measurement control operation in the spectrum analyzer 1 employing the filter bank circuit 10B according to modification 1 will be explained with reference to the flowchart shown in FIG. 10, based on the flow of "SPDT SW control" and "LO1, LO2 frequency setting" control described with reference to FIG. 9. In FIG. 10, the same processing steps as those of the signal measurement control operation in the spectrum analyzer 1 employing the filter bank circuit 10A shown in FIG. 7 are given the same reference numerals.

In FIG. 10, processing steps S4A, S6A, and S41A that are different from the processing steps shown in FIG. 7 will be mainly explained. In this spectrum analyzer 1, if it is determined that the number of the filters 21, 22 to be selected in step S3 is singular ("single" in step S3), the control unit 150 sets a path of the changeover switch 20 that corresponds to the path of that filter, and at the same time, sets the local frequency (LO1 or LO2) (step S41A).

Next, in the control unit 150, the filter changeover control unit 151 switches the changeover switch 20 between the first filter group G1 and the second filter group G2 based on the route setting in step S41A. In accordance with the changeover, the frequency sweep control unit 152 controls the frequency sweep for the local signal generator 112-1 or the local signal generator 112-2 based on the LO (LO1 or LO2) settings. During these operations, measurements are performed with the filters 21 or 22 (step S42).

On the other hand, if it is determined that the number of the filters 21, 22 selected in step S3 is plural ("plural" in step S3), the control unit 150 performs the processes of steps S4A to S7. First, the control unit 150 sets the LO (LO1 or LO2) frequency corresponding to the first selected filter of the filters 21 or 22 for the local signal generator 112-1 corresponding to the filters 21, or for the local signal generator 112-2 corresponding to the filters 22 (step S4A).

Next, the control unit 150 sets the path of the changeover switch 20 corresponding to the first selected filter (for example, one of the filters 21), and performs measurement with the first selected filter of the filters 21 (step S5).

During the measurement in step S5, the control unit 150 sets the LO (LO2) frequency corresponding to the second selected filter of the filters 22 for the local signal generator 112-2 corresponding to the filters 22, as in step S4A (step S6A).

Subsequently, the control unit 150 sets the path of the changeover switch 20 corresponding to the second selected filter of the filters 22, and performs measurement with the second selected filter of the filters 22 (step S7).

Thereafter, if it is determined in step S8 that there is a filter to be selected next from the filters 21, 22, . . . (YES in step S8), the control unit 150 reads the second filter as the n-th filter and repeatedly performs the above steps S6A and S7 until there are no more filters to be selected next from the filters 21, 22, . . . (step S9). Also during the measurement period using the second to n-th filters, the control unit 150 performs the setting of the LO (LO1, LO2, . . . ) frequency for the local signal generator 112-1 or local signal generator 112-2 corresponding to the next selected filter of the filters 21, 22, . . . , performs the measurement with the selected filter of the filters 21, 22, . . . , and during the measurement with the selected filter of the filters 21, 22, . . . , performs the setting of the LO (LO2, LO1, . . . ) frequency corresponding to the next selected filter of the filters 22, 21 . . . , and so on. Such operation steps are repeated until n-th filter.

By the signal measurement operation shown in FIG. 10, in the spectrum analyzer 1, while measurement is performed with one of the first filter group G1 and the second filter group G2, the LO frequency of the other is set. Since the LO frequency setting has already been completed when the measurement of the next passband starts (see FIG. 9), there is no waiting time until the LO frequency setting is completed, so that the measurement can be started immediately. According to this signal measurement operation, there is no need to consider waiting for the completion of the LO frequency setting when controlling the changeover switch 20.

Modification 2

Figure 11:
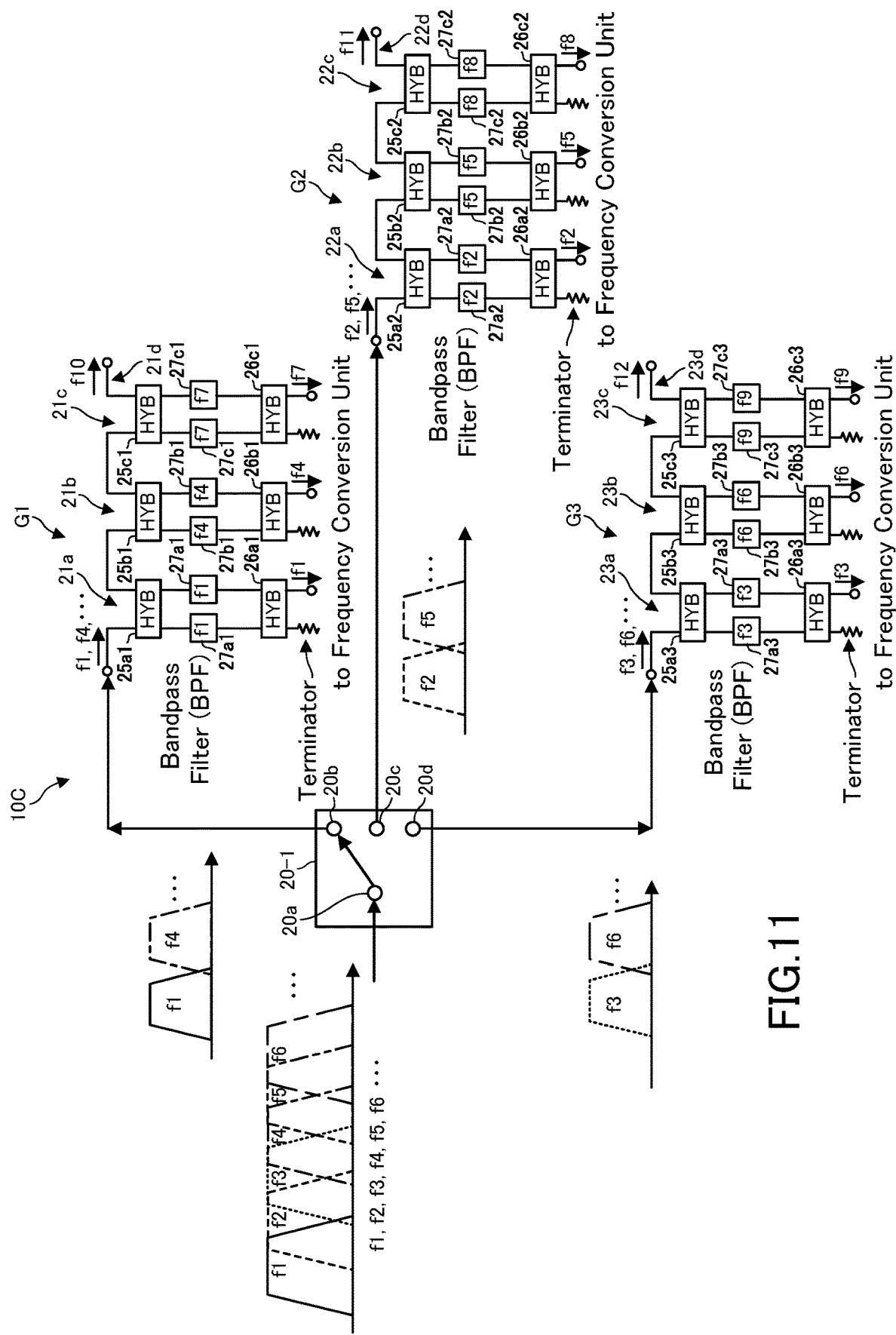
FIG. 11 is a diagram showing the configuration of a filter bank circuit according to modification 2 of the present invention.

FIG. 11 shows the configuration of a filter bank circuit 10C according to modification 2 of the spectrum analyzer 1 according to the present embodiment. As shown in FIG. 11, the filter bank circuit 10C according to modification 2 includes a single-pole three-throw changeover switch 20-1, and is configured to control the changeover switch 20-1 to selectively connect an input terminal 20a to one of output terminals 20b, 20c, 20d, so that the input signal from the input terminal 20a is selectively supplied to either the first filter group G1, the second filter group G2, or the third filter group G3.

In the filter bank circuit 10C according to modification 2, the first filter group G1 includes filters 21a, 21b, 21c that have bands f1, f4, f7, f10 as respective passbands that do not overlap each other. The second filter group G2 includes filters 22a, 22b, 22c that have bands f2, f5, f8, f11 as respective passbands that do not overlap each other. The third filter group G3 includes filters 23a, 23b, 23c that have bands f3, f6, f9, f12 as respective passbands that do not overlap each other.

The filters 21a, 21b, 21c constituting the first filter group G1 are each constituted by a BLC filter bank in which two BPFs 27a1, 27b1, 27c1 are arranged between hybrid 25a1, 25b1, 25c1 on the input side and hybrid 26a1, 26b1, 26c1 on the output side, as in the embodiments described above (see FIGS. 1 and 5). The filters 22a, 22b, 22c constituting the second filter group G2 are each constituted by a BLC filter bank in which two BPFs 27a2, 27b2, 27c2 are arranged between hybrid 25a2, 25b2, 25c2 on the input side and hybrid 26a2, 26b2, 26c2 on the output side. The filters 23a, 23b, 23c constituting the third filter group G3 (hereinafter also referred to as filters 23) are each constituted by a BLC filter bank in which two BPFs 27a3, 27b3, and 27c3 are arranged between hybrid 25a3, 25b3, and 25c3 on the input side and hybrid 26a3, 26b3, and 26c3 on the output side. Here, the number of the filters 21, 22, and 23 constituting filter groups G1, G2, and G3, respectively, can be any number.

Regarding the passbands (bands f1, f4, f7, f10, bands f2, f5, f8, f11, and bands f3, f6, f9, f12) of, respectively, the filters 21a, 21b, 21c constituting the first filter group G1, the filters 22a, 22b, 22c constituting the second filter group G2, and the filters 23a, 23b, 23c constituting the third filter group G3, adjacent passbands (bands) are set to overlap in the order from band f1 to band f12, as shown on the input side of the changeover switch 20-1 in FIG. 11.

Here, the grouping of the filter groups G will be explained. Referring to the filter bank circuits 10A and 10B according to the embodiment and modification 1 described above, regarding the grouping of the filter groups G, when the overlap between the filters 21 and the overlap between the filters 22 are large, grouping into two filter groups G1 and G2 (2-division) may not provide sufficient guard bands. For the request to widen the guard bands, grouping into 3 filter groups G1, G2, and G3 (3-division) as in modification 2 may be more advantageous than 2-division. In particular, when the present invention is applied to a signal analyzer, the overlap band also increases as the signal to be analyzed becomes broadband. Therefore, if sufficient guard bands cannot be obtained, the number of divisions must be increased.

However, in the present invention, the grouping of the filter groups G is not limited to 2-division or 3-division, but as described above, the number of divisions can be increased to a larger number n (n is an integer of 3 or more). A configuration may be adopted in which a single-pole n-throw switch (SPnT SW) is used as the changeover switch 20. According to the configuration which divides the filter groups G into n filter groups G1 to Gn by the SPnT SW, it is possible to obtain sufficient guard bands in each group.

In the filter bank circuit 10C according to modification 2 having the divided filter groups G1, G2, and G3 shown in FIG. 11, the filter bank circuit 10C can be operated by controlling the measurement operation according to the flowchart shown in FIG. 7, for example, in the similar way to the filter band circuit 10A shown in FIG. 1, other than the switch whose number of paths is changed from two to three. According to the configuration of the filter bank circuit 10C according to modification 2, there is an advantage that it is easier to secure guard bands in the filters 21, 22, and 23 in each of the filter groups G1, G2, and G3, compared to the filter bank circuit 10A shown in FIG. 1.

Modification 3

In the spectrum analyzer 1 according to the present embodiment, each of the filters 21, 22, . . . constituting filter groups G1, . . . , Gn is not limited to a BLC filter bank configuration using a branch line coupler as a hybrid, such as, for example, the filters 21a, 21b, 21c, and the filters 22a, 22b, 22c and the like shown in FIG. 1.

Figure 12:
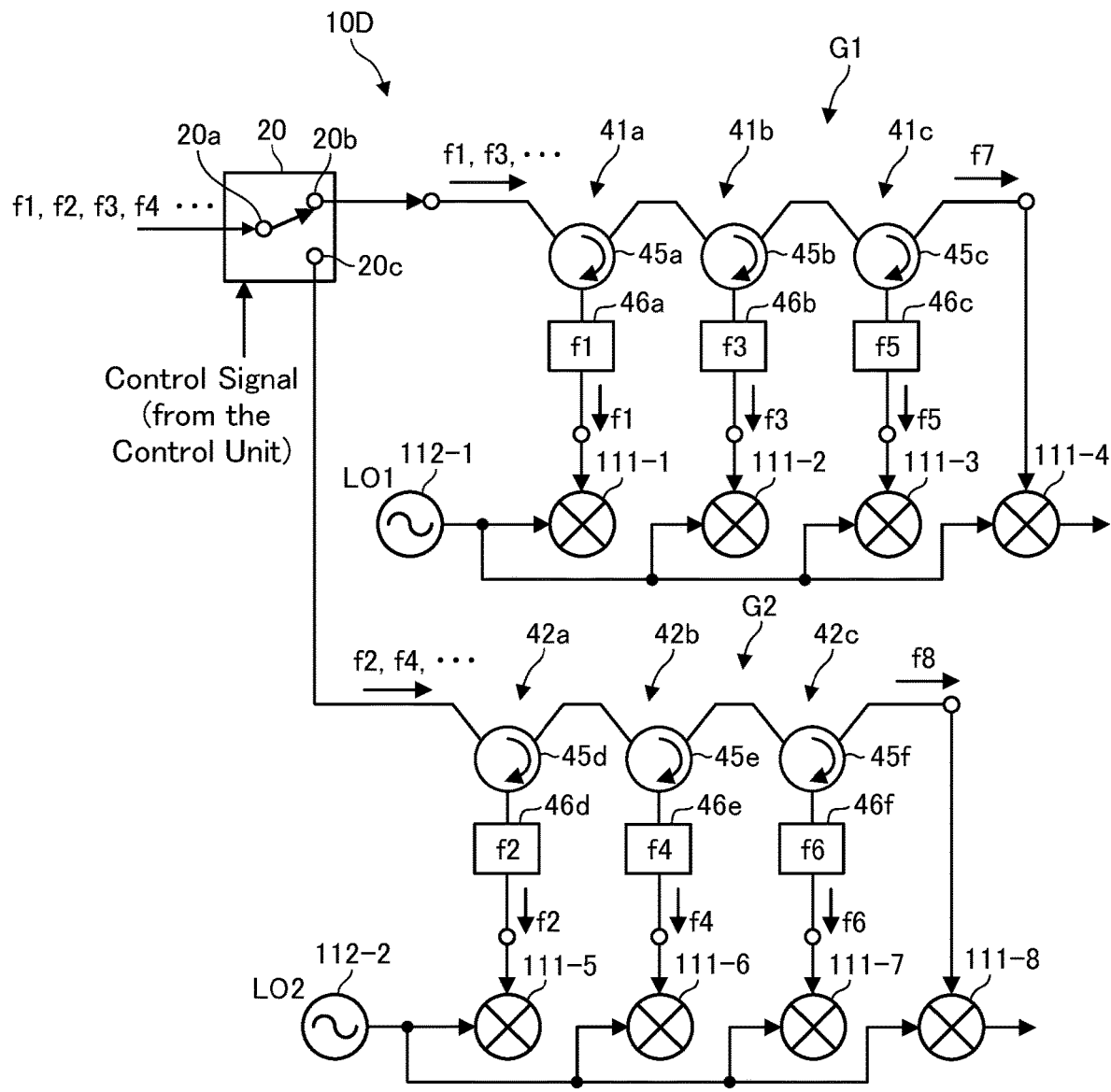
FIG. 12 is a diagram showing the configuration of a filter bank circuit according to modification 3 of the present invention.

FIG. 12 shows the configuration of a filter bank circuit 10D according to modification 3 of the spectrum analyzer 1 according to the present embodiment. In the filter bank circuit 10D according to modification 3, the changeover switch 20, the local signal generators 112-1, 112-2, and the mixers 111-1, 111-2, 111-3, 111-4, 111-5, 111-6, 111-7, and 111-8 are equivalent to those of the filter bank circuit 10B (see FIG. 8) according to modification 1.

In the filter bank circuit 10D according to modification 3, the first filter group G1 has filters 41a, 41b, and 41c, and the second filter group G2 has filters 42a, 42b, and 42c. The filters 41a, 41b, and 41c have, respectively, circulators 45a, 45b, and 45c, and BPFs 46a, 46b, and 46c. Further, the filters 42a, 42b, and 42c have, respectively, circulators 45d, 45e, and 45f, and BPFs 46d, 46e, and 46f. The circulators 45a, 45b, 45c and the circulators 45d, 45e, 45f each have an input port (first port) for inputting a signal under test, and an output port (second port) for outputting a signal in a passband set for the signal under test, and a transfer port (third port) for transferring signals outside the set passband for the signal under test to the next stage.

The BPFs 46a, 46b, and 46c constituting the first filter group G1 are provided in combination with adjacent bands f1, f3, f5, and f7 that do not overlap each other as passbands. The BPF 46d, 46e, and 46f constituting the second filter group G2 are provided in combination with adjacent bands f2, f4, f6, and f8 that do not overlap each other as passbands. Further, between the first filter group G1 and the second filter group G2, the bands f1, f2, f3, f4, f5, f6, f7, and f8 are set to have regions in which adjacent bands overlap.

According to the spectrum analyzer 1 including the filter bank circuit 10D according to modification 3, when the changeover switch 20 is controlled so that the input terminal 20a is connected to the output terminal 20b, the input signal is supplied to the first filter group G1 side. At this time, among the signal components of bands f1, f3, f5, and f7 that are input signals, the signal component of the band f1 is supplied to the mixer 111-1 through the circulator 45a and the BPF 46a. The signal component of band f3 is inputted from circulator 45a to circulator 45b, and then supplied to the mixer 111-2 through the BPF 46b. The signal component of band f5 is inputted to the circulator 45c through the circulators 45a and 45b, and then supplied to the mixer 111-3 through the BPF 46c. The signal component of band f7 is inputted to the circulator 45c through the circulators 45a and 45b, and then supplied to the mixer 111-4 without passing through the BPF 46c.

Further, when the changeover switch 20 is controlled so that the input terminal 20a is connected to the output terminal 20c, the input signal is supplied to the second filter group G2 side. At this time, among the signal components of bands f2, f4, f6, and f8 that are input signals, the signal component of band f2 is supplied to the mixer 111-5 through the circulator 45d and the BPF 46d. The signal component of band f4 is inputted from the circulator 45d to the circulator 45e, and then supplied to the mixer 111-6 through the BPF 46e. The signal component of band f6 is inputted to the circulator 45f through the circulators 45d and 45e, and then supplied to the mixer 111-7 through the BPF 46f. The signal component of band f8 is inputted to the circulator 45f through the circulators 45d and 45e, and then supplied to the mixer 111-8 without passing through the BPF 46f.

For example, by controlling the changeover switch 20 according to the flowchart shown in FIG. 10 and controlling the LO (LO1, LO2) frequency settings for the local signal generators 112-1 and 112-2, the spectrum analyzer 1 performs the setting of the other LO frequency while measuring with either the first filter group G1 or the second filter group G2, as in the case where the filter bank circuit 10B according to modification 1 is provided, thereby making it possible to perform a signal measurement operation without waiting time until the LO frequency setting is completed.

Other Modifications

As another modification of the filter bank circuit 10A used in the spectrum analyzer 1 according to the present embodiment, for example, BPFs, low-pass filters (LPF), high-pass filters (HPF), and band-elimination filters (BEF) may be used alone or in combination, instead of using the above-mentioned BLC filter banks or circulators in each of the filters 21, 22, . . . constituting the filter groups G1 to Gn.

To give a specific example, in the filter bank circuit 10 according to another modification, the filters 21, 22, . . . may be configured only by BPFs that allow the frequency components of the passbands set in correspondence with the filters 21, 22, . . . . By this configuration, each of the filters 21, 22, . . . in the filter groups G can be easily realized using general-purpose BPFs, and it is expected that the structure will be simplified and the cost will be reduced.

Further, in the filter bank circuit 10A according to yet another modification, the filters 21, 22, . . . may be configured by HPFs that pass the frequency components in the frequency bands above the passbands set corresponding to the filters 21, 22, . . . and LPFs that pass frequency components in the frequency bands below the passbands. By this configuration, each of the filters 21, 22, . . . in the filter groups G can be easily realized by using general purpose HPFs and LPFs, so that simplification of the configuration and reduction of the cost can be expected.

Further, in the present embodiment, various modifications or applications regarding the configuration of the filter bank circuit 10 are possible, within the scope that does not deviate from the main idea that the guard bands between adjacent filters are ensured within each of the filter groups G1 to Gn, and the overlap between adjacent passbands is maintained in the whole of the filter groups G1 to Gn.

As described above, the filter bank circuit 10 (10A, 10B, 10C, 10D) according to the present embodiment includes: the one-pole n-throw type changeover switch 20 that performs changeover among n (n is an integer of 2 or more) output terminals 20b, 20c, 20d, . . . connected to one input terminal 20a; and the n filter groups G1, G2, . . . , Gn respectively connected to the n output terminals 20b, 20c, 20d, . . . . Each of the filter groups G1, G2, . . . , Gn has m (m is an integer of 2 or more) filters (filters 21, 22, . . . ). Each of the filters 21, 22, . . . in the n filter groups G1, G2, . . . , Gn has a passband that does not overlap with a passband of any other filter in the same filter group, and overlaps with a passband of one filter in other one filter group by a predetermined bandwidth (ol1, ol2, . . . ). The predetermined bandwidth is set to a band wider than a band occupied by a signal under test or a test signal, so that the signal under test or the test signal is not dropped. Here, the numbers n and m can be arbitrarily selected.

By this configuration, the filter bank circuit 10 according to an embodiment of the present invention can maintain the overlap between the passbands of the filters 21, 22 included in different filter groups G (G1, G2, . . . ) while maintaining the guard bands between the passbands of the filters 21, 22 included in the same filter group by switching among a plurality of filter groups G on a group-by-group basis. By using the filter groups G that do not have moving parts, the filter bank circuit 10 does not require long changeover time or complicated changeover control unlike mechanically switched filter banks (see FIG. 17). It is possible to measure a signal under test or perform a test on a DUT for all frequency bands with appropriate overlap bands.

In addition, in the filter bank circuit 10 according to the present embodiment, when a signal having a predetermined frequency component, for example, in the millimeter wave band from 255 to 315 GHz is inputted to the filter bank circuit, the predetermined frequency component in the millimeter wave band is extracted by dividing the signal into n×m frequency components respectively corresponding to n×m mutually overlapping passbands of the n×m filter circuits.

By this configuration, the filter bank circuit 10 according to the present embodiment has no band that cannot be targeted, for example, for measuring or testing a signal under test or a test signal of a predetermined frequency component. It is possible to extract a frequency component with unnecessary radio waves suppressed, by extremely easy and short-time changeover control of the changeover switch 20.

In addition, in the filter bank circuit 10A according to the present embodiment, the filters 21 and 22 constituting the filter groups G1 and G2 are constituted by filter banks that use the BLCs and pass frequency components of the passbands that are set corresponding to the filters 21 and 22.

By this, the filter bank circuit 10A according to the present embodiment employs the filter banks using BLCs and BPFs, together with the changeover switch 20, so that the structure can be simplified and the cost can be reduced.

Furthermore, in the filter bank circuit 10 according to the present embodiment, the filters 21 and 22 may be constituted by BPFs that pass frequency components of the passbands that are set corresponding to the filters 21 and 22. By this, in the filter bank circuit 10, the filters 21 and 22 in the filter groups G1 and G2 can be easily realized using general-purpose BPFs, so that the structure can be simplified and the costs can be reduced.

Further, in the filter bank circuit 10D according to the present embodiment, the filters 41a, 41b, 41c, 42a, 42b, and 42c may include the circulators 45a to 45f and the BPFs 46a to 46f. Each of the circulators has an input port, an output port, and a transfer port. When a frequency component inputted to the input port is a frequency component corresponding to the filter at the stage, the circulator outputs the frequency component to the output port. When the frequency component inputted to the input port is outside the frequency component corresponding to the filter at the stage, the circulator outputs the frequency component from the transfer port to an input port of the next stage. The band-pass filter is connected to the output port, and the passband of the band-pass filter is set according to the number of stages. By this, in the filter bank circuit 10D, the filters 21 and 22 in the filter groups G1 and G2 can be easily realized using general-purpose circulators and BPFs, so that the structure can be simplified and the cost can be reduced.

Further, in the filter bank circuit 10 according to the present embodiment, the filters 21 and 22 may be configured by the combination of HPFs and LPFs to pass frequency components of the passbands that are set corresponding to the filters 21 and 22. By this, in the filter bank circuit 10, the filters 21 and 22 in the filter groups G1 and G2 can be easily realized using general-purpose HPFs and LPFs, so that the structure can be simplified and the costs can be reduced.

Further, the spectrum analyzer 1 according to the present embodiment includes: the frequency conversion unit 100 that inputs a signal under test of a predetermined frequency to the mixer 111 together with a local signal outputted from the local signal generator 112 and has the filter 113 that extracts a signal in a predetermined intermediate frequency band from a signal outputted from the mixer 111; and the detector 120 that detects a signal of the intermediate frequency band. The spectrum analyzer 1 varies the frequency of the local signal according to the frequency range to be analyzed, and determines the spectrum characteristics of the signal under test. The spectrum analyzer 1 further includes the above-described filter bank circuit 10 (10A, 10B, 10C, 10D) that is provided before the frequency conversion unit 100.

This spectrum analyzer 1 includes the filter changeover control unit 151 that controls the changeover switch 20, to which the signal under test is inputted at the input terminal 20a, so that one filter group is selected among a plurality of the filter groups G1 and G2 repeatedly in order by group, according to the analysis target frequency. The spectrum analyzer 1 sequentially extracts and detects frequency components that pass through the filters 21 and 22 having the passband corresponding to one frequency band in the analysis target frequency range, for each filter group that is repeatedly selected in order.

Figure 17:
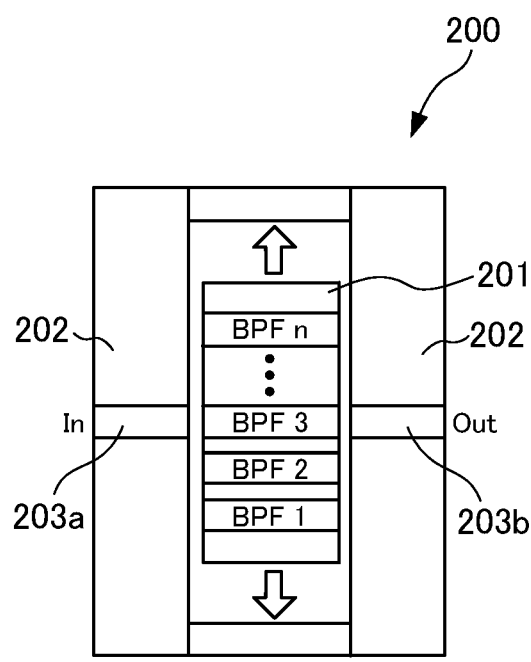
FIG. 17 is a diagram showing the configuration of a filter bank provided in a front-end circuit of a conventional spectrum analyzer.

By this configuration, the spectrum analyzer 1 can extract the frequency components corresponding to multiple (maximum (n m)) passbands that overlap each other from the signal under test inputted to the filter bank circuit 10 in the state that unnecessary radio waves are suppressed and output them to the detector 120, so that the smooth measurement of the spectrum characteristics of signals in all bands can be realized by using the filter groups G1 and G2 that do not have moving parts without requiring long changeover time or complicated changeover control unlike mechanically switched filter banks (see FIG. 17).

In addition, the spectrum analyzer 1 according to the present embodiment further includes: a plurality of the local signal generators 112-1 and 112-2 respectively provided corresponding to a plurality of the filter groups G1 and G2; the mixers 111-1, 111-2, 111-3, 111-4, 111-5, 111-6, 111-7, 111-8 provided to the filters 21 and filters 22 that constitute the plurality of filter groups G1 and G2; and the frequency sweep control unit 152 for setting local frequencies for the mixers 111-1, 111-2, 111-3, 111-4, 111-5, 111-6, 111-7, 111-8 corresponding to the filters 21 and 22 each having the passband corresponding to one frequency band in the filter group G1 or G2 to be selected next, while measuring the spectrum characteristics with the filters 21 and 22 each having the passband corresponding to one frequency band in the selected filter group G1 or G2.

By this configuration, the spectrum analyzer 1 according to the present embodiment can eliminate wasteful waiting time for setting the local frequency between a time in which the measurement is performed by the filters 21 or 22 in a currently selected filter group and a time in which the measurement is performed by the filters 21 or 22 in a next filter group, so that smooth measurements can be performed Further, the method for controlling the filter bank circuit 10 in the spectrum analyzer 1 using the filter bank circuit 10 according to the present embodiment includes: a setting step (S1) of setting an analysis target frequency; a step (S2) of calculating or determining the filters 21, 22 to be selected from the filter groups G1, G2 based on the set analysis target frequency; a step (S5) of setting the path of the changeover switch 20 corresponding to the filters 21, 22 to be selected, and controlling the switching of the changeover switch 20 to select the filter group G1 or G2 to which the filters 21, 22 to be selected belong; and a step (S5, S7, S9) of extracting the frequency components passing through the filters 21 or 22, determined in the determining step, in the filter group G1 or G2 switched by the step of controlling the switching.

By this configuration, according to the control method of the filter bank circuit 10, the frequency range to be analyzed can be assigned to one or ones of a plurality of (n×m) passbands that overlap each other, and the frequency component of each passband can be extracted from the signal under test in the state that unnecessary radio waves are suppressed. By simple changeover control of the switch, it is possible to eliminate bands that cannot be used for measurement or testing, and it is also possible to shorten the changeover time of the switch 20.

Signal Analyzer 2 Using Filter Bank Circuit 10

The filter bank circuit 10A according to the above embodiment is applicable not only to the spectrum analyzer 1 shown in FIG. 4 but also to a signal analyzer 2 that performs analysis processing of a signal in a predetermined frequency band, for example.

Figure 13:
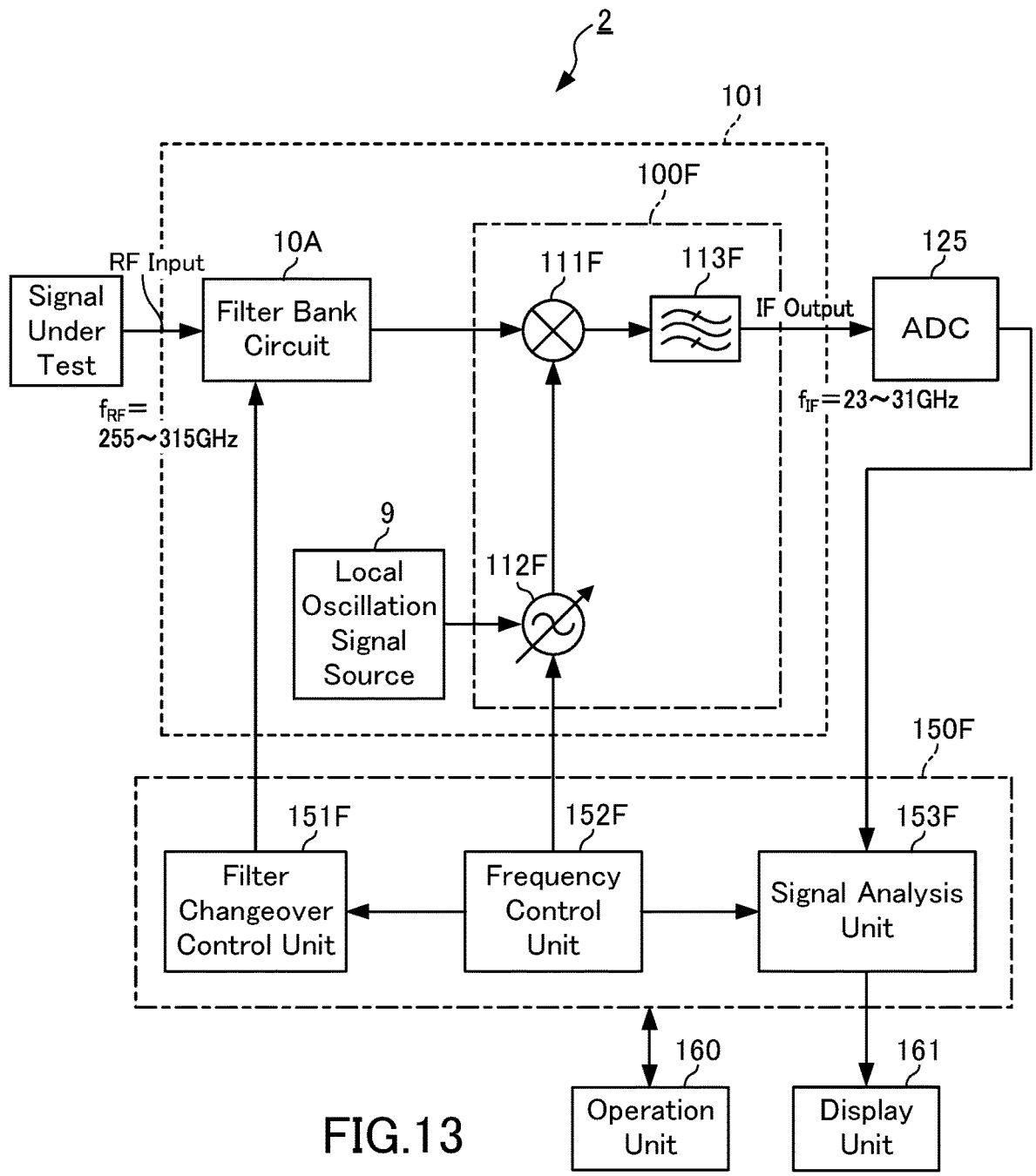
FIG. 13 is a diagram showing the configuration of a signal analyzer using a filter bank circuit according to an embodiment of the present invention.

FIG. 13 is a diagram showing a general configuration of the signal analyzer 2 using the filter bank circuit 10A. This signal analyzer 2 has a frequency conversion unit 100F, an analog to digital converter (ADC) 125, a control unit 150F, an operation unit 160, and a display unit 161, and is provided with the filter bank circuit 10A having the above-mentioned configuration before the frequency conversion unit 100F (see FIG. 1).

The frequency conversion unit 100F is configured to include a mixer 111F, a local signal generator 112F, and a filter 113F.

The filter bank circuit 10A outputs the filtered signal (RF) having frequency components in which spurious waves are suppressed. The mixer 111F mixes a signal outputted from the filter bank circuit 10A with a local signal inputted from the local signal generator 112F, thereby converting the filtered signal from an RF signal to an intermediate frequency (IF) signal, and outputs the converted signal.

The local signal generator 112F generates the local signal to be sent to the mixer 111F based on a local oscillation signal (reference signal) inputted from the local oscillation signal source 9.

The filter 113F is a filter function unit that inputs the IF signal frequency-converted by the mixer 111F, passes only a signal having frequency components in a preset band of the inputted IF signal, and inputs the passed signal to the ADC 125. Here, overlap bands are set so that the signal (signal under test) having the frequency component in the preset band of the IF signal is not lost in the filter bank circuit 10A. This means that the overlap band needs to have a band wider than the band of this IF signal.

The signal under test passes through the filter bank circuit 10A and is frequency-converted by the frequency conversion unit 100F. The ADC 125 converts the frequency-converted signal from an analog signal to a digital signal.

The control unit 150F includes a filter changeover control unit 151F, a frequency control unit 152F, and a signal analysis unit 153F. The filter changeover control unit 151F is equivalent to that provided in the control unit 150 of the spectrum analyzer 1 (see FIG. 7).

The frequency control unit 152F performs control to set the local frequency so that a signal in the specified analysis target frequency range can be received when the frequency conversion unit 100F converts the frequency of the signal under test. The local signal generator 112F that constitutes the frequency conversion unit 100F has a configuration that can vary the local frequency according to the received RF frequency. For this reason, the frequency control unit 152F may be configured to control the local signal generator 112F and control the sweep of the local frequency.

The signal analysis unit 153F performs processing to analyze the waveform of a signal (signal under test) converted into a digital signal by the ADC 125. Specifically, the signal analysis unit 153F analyzes waveform analysis data and modulation signal for displaying a waveform such as a spectrum of the digital signal, and executes processing to generate modulation analysis results.

In the signal analyzer 2 having the above configuration, in order to perform signal analysis processing, an analysis target frequency is set, for example, by a predetermined setting operation on the operation unit 160. This process corresponds to the process of step S1 (see FIG. 7) in the spectrum analyzer 1.

Next, the control unit 150F performs a process of calculating or determining the filters 21, 22 to be selected from the filter groups G1, G2 in the filter bank circuit 10A based on the set analysis target frequency. This process corresponds to the process of step S2 (see FIG. 7) in the spectrum analyzer 1.

Subsequently, the control unit 150F determines the path of the changeover switch 20 corresponding to the filters 21, 22 to be selected, calculated in the above calculation process, and then the filter changeover control unit 151F performs the changeover of the switch 20 to select either the filter group G1 or G2 to which a filter to be selected from the filters 21 and 22 belongs. This process corresponds to the process in step S5 (see FIG. 7) in the spectrum analyzer 1.

By this, in the filter bank circuit 10A, the signal under test inputted from the input terminal 20a of the changeover switch 20 is outputted to the filters 21 or 22 determined by the above calculation process, in the filter group G1 or G2 switched by the above switching control, and the frequency components that have passed through the filter groups G are inputted to the frequency conversion unit 100F as an analysis target.

In the frequency conversion unit 100F, the signal having the frequency components obtained by the filtering of the filter bank circuit 10A is mixed, by the mixer 111F, with the local signal obtained by the local signal generator 112F and converted into an intermediate frequency band, and a signal in a predetermined intermediate frequency band is extracted by the filter 113F from the mixed and frequency-converted signal and sent to the ADC 125.

The ADC 125 converts the frequency-converted and filtered signal from an analog signal to a digital signal and inputs the converted digital signal to the signal analysis unit 153F. The signal analysis unit 153F analyzes the digital signal inputted from the ADC 125, waveform analysis data for displaying a waveform such as a spectrum of the digital signal, and a modulation signal, and executes processing to generate a modulation analysis result. Further, the control unit 150F performs control for signal analysis, such as displaying the waveform analysis data generated by the signal analysis unit 153F on the display unit 161.

Here, the signal analyzer 2 using the filter bank circuit 10A is exemplified, but instead of the filter bank circuit 10A, other filter bank circuit 10 such as the filter bank circuit 10B according to the above-mentioned modification 1, the filter bank circuit 10C according to modification 2, the filter bank circuit 10D according to modification 3, and the like can also be used.

Thus, the signal analyzer 2 according to the present embodiment includes the frequency conversion unit 100F and the signal analysis unit 153F. The frequency conversion unit 100F provides the signal under test of a predetermined frequency component to the mixer 111F together with the local signal outputted from the local signal generator 112F. The frequency conversion unit 100F includes the filter 113F that extracts a signal in a predetermined intermediate frequency band from a signal outputted from the mixer 111F. The signal analysis unit 153F analyzes the waveform of the signal after converting the intermediate frequency band signal into a digital signal by the ADC 125. The signal analyzer 2 changes the frequency of the local signal according to the frequency to be analyzed, and analyzes the waveform of the signal under test.

The signal analyzer 2 according to the present embodiment includes: the filter bank circuit 10 having the above-described configuration at the front stage of the frequency conversion unit 100F; and the filter changeover control unit 151F that controls the switch 20, to which the signal under test is inputted at the input terminal 20a, so that one filter group is selected among a plurality of the filter groups G1, G2, according to the analysis target frequency. The signal analyzer 2 extracts a frequency component that passes through the filters 21 and 22 having the passband corresponding to one frequency band corresponding to the analysis target frequency, converts a signal of the frequency component from an analog signal to a digital signal, and then analyzes the waveform of the signal of the frequency component, for each selected filter group.

By this configuration, the signal analyzer 2 according to the present embodiment can extract, from a signal under test inputted to the filter bank circuit 10A, the frequency components corresponding to a plurality of (n×m) passbands that overlap each other and secure overlapping bands to avoid loss of the signal under test, and output them having unnecessary radio waves suppressed to the ADC 125. Thus it is possible to perform smooth and precise signal analysis for signals in all bands by using the filter groups that do not have moving parts without requiring long changeover time or complicated changeover control unlike mechanically switched filter banks.

Further, the method for controlling the filter bank circuit 10A in the signal analyzer 2 using the filter bank circuit 10A according to the present embodiment includes: a setting step (S1) of setting a test target frequency; a determining step (S2, S12) of calculating or determining the filters 21, 22 to be selected from the filter groups G1, G2 based on the set test target frequency; a controlling step (S5, S13) of setting the path of the changeover switch 20 corresponding to the selected filters 21, 22, and controlling the changeover switch 20E to select one of the filter groups G1, G2 to which the selected filters 21, 22 belong; and a step of extracting frequency components, out of the filter groups G1, G2 switched by the controlling step, that pass through the filters 21, 22 determined in the determining step.

According to the control method of this filter bank circuit 10A, that is installed in the signal analyzer 2, the frequency to be tested is assigned to one of a plurality of overlapping passbands, and the band in which the DUT cannot be tested can be eliminated by the simple changeover control of the changeover switch 20, and it is also possible to shorten the switching time of the changeover switch.

Signal Generator 3 Using Filter Bank Circuit 10E

The filter bank circuit 10 such as the filter bank circuit 10A according to the above embodiment, the filter bank circuit 10B according to the modification 1, the filter bank circuit 10C according to the modification 2, and the filter bank circuit 10D according to the modification 3 can be implemented not only in the spectrum analyzer 1 shown in FIG. 4 but also, for example, in a signal generator 3 that performs a reception sensitivity test of a DUT.

Figure 14:
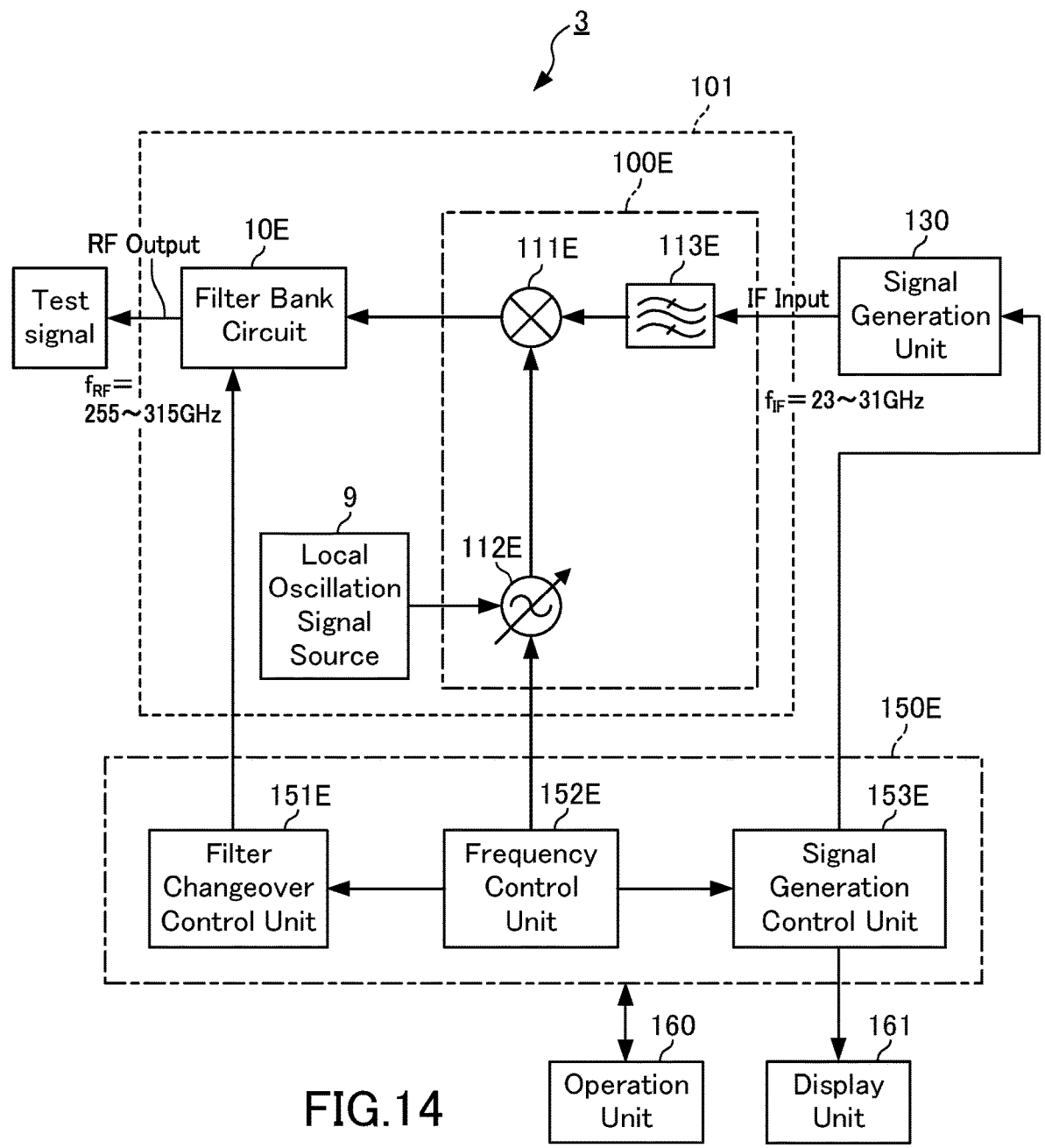
FIG. 14 is a diagram showing the configuration of a signal generator using a filter bank circuit according to an embodiment of the present invention.

FIG. 14 is a diagram showing a general configuration of the signal generator 3 using the filter bank circuit 10 described above. The signal generator 3 is assumed to be a test signal generator that generates a test signal for testing the reception sensitivity of a millimeter wave band signal to a DUT.

This signal generator 3 includes a frequency conversion unit 100E, a signal generation unit 130, a control unit 150E, an operation unit 160, a display unit 161, and a filter bank circuit 10E provided after the frequency conversion unit 100E. The frequency conversion unit 100E includes a mixer 111E, a local signal generator 112E, and a filter 113E. The control unit 150E includes a filter changeover control unit 151E, a frequency control unit 152E, and a signal generation control unit 153E.

In the signal generator 3, the frequency conversion unit 100E provides a test signal in the intermediate frequency band outputted from the signal generation unit 130 under the control of the signal generation control unit 153E, together with a local signal outputted from the local signal generator 112E, to the mixer 111E to convert the test signal into a signal in the millimeter wave band. At that time, the frequency conversion unit 100E sends the frequency-converted signal to the subsequent stage as a signal for testing the DUT while changing the frequency of the local signal by the frequency control unit 152E according to the frequency to be tested, which is set by the operation unit 160, for example, in order to test the DUT.

As the filter bank circuit 10E provided in the latter stage, the above-mentioned filter bank circuits 10A, 10B, 10C, 10D, and the like can be used, but here, in particular, the configuration using the filter bank circuit 10A (see FIG. 1) is assumed.

Figure 15:
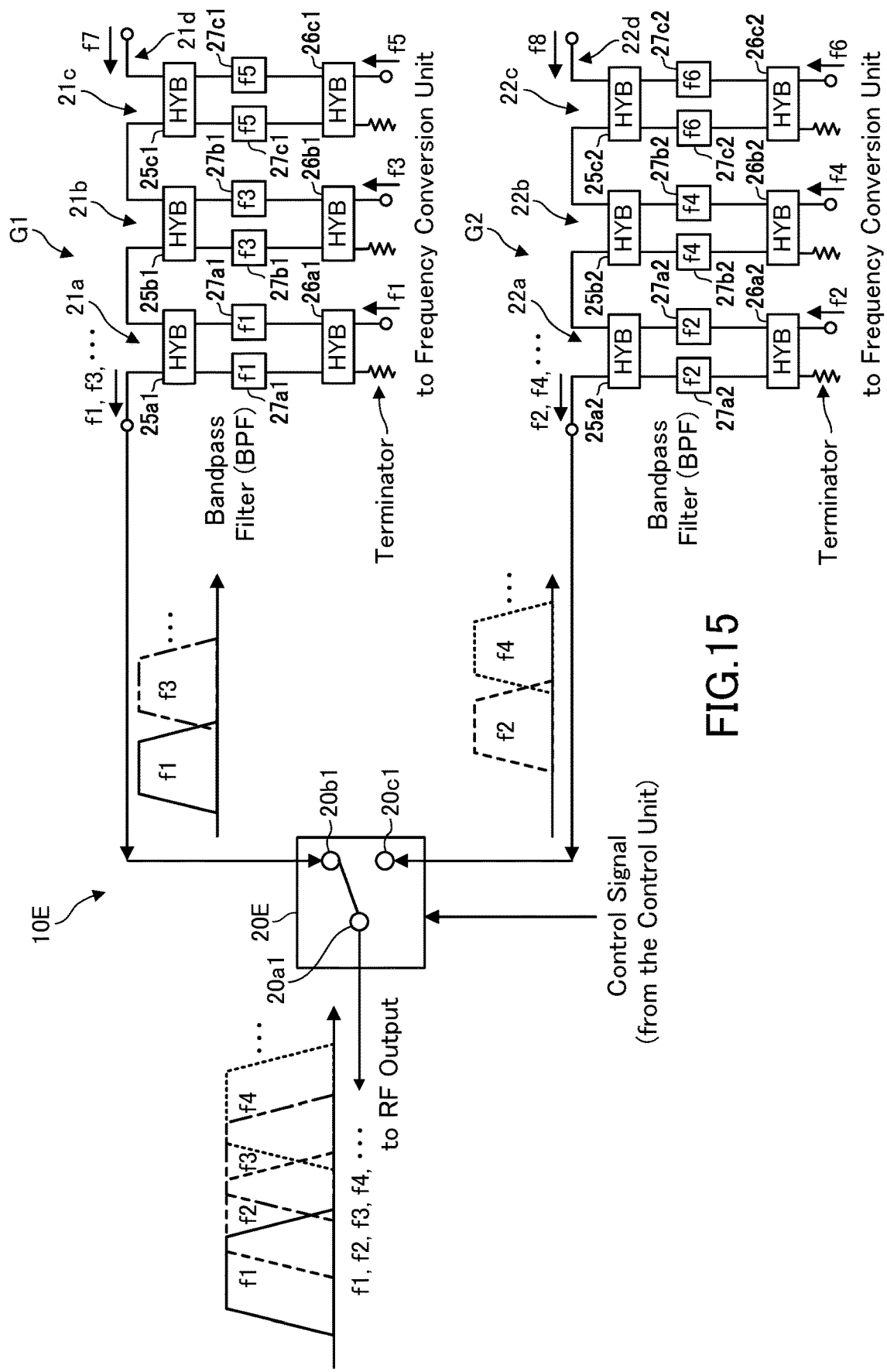
FIG. 15 is a configuration diagram of a filter bank circuit of a signal generator using the filter bank circuit according to an embodiment of the present invention.

For example, as shown in FIG. 15, the filter bank circuit 10E in the signal generator 3 is configured to implement the filter bank circuit 10A shown in FIG. 1 so that the following operations can be done. An IF signal (test signal) is inputted to the frequency conversion unit 100E from the signal generation unit 130. The IF signal is converted by the frequency conversion unit 100E into an RF frequency (f1, f2, f3, . . . ) signal. The converted signal is inputted to an input terminal 20b1 or 20c1 of the changeover switch 20E via the filter group G1 or filter group G2. In the switch 20E, one of the input terminals 20b1 and 20c1 is selected by a changeover signal from the filter changeover control unit 151E. The signal inputted to the switch 20E is sent out from an output terminal 20a1 as a test signal (RF Output). That is, in the filter bank circuit 10E used in the signal generator 3, the output terminals 20b and 20c of the changeover switch 20 of the filter bank circuit 10A function as input terminals 20b1 and 20c1, respectively, of the changeover switch 20E. Similarly, the input terminal 20a of the changeover switch 20 functions as the output terminal 20a1 of the changeover switch 20E.

In testing the DUT using the signal generator 3, after setting the frequency to be tested on the operation unit 160, the test signal satisfying the setting conditions is generated from the signal generation unit 130 under the control of the signal generation control unit 153E. The test signal is frequency-converted to an RF signal in the frequency conversion unit 100E. Then, the RF signal is inputted to the input terminals 20b1 and 20c1 of the changeover switch 20E in the filter bank circuit 10E via the filter groups G1 and G2.

At that time, in the control unit 150E, the filter changeover control unit 151E performs changeover control of the changeover switch 20 to which the frequency-converted signals (f1, f2, f3, . . . ) are inputted. The changeover control is performed so that one of the filter groups G1 and G2 is selected on a group-by-group basis according to the set test target frequency. By this changeover control, when the filter group G1 is selected, the signals of bands f1, f3, f5, . . . pass through the filters 21 having corresponding passbands and are extracted as a test signal. When the filter group G2 is selected, the signals of bands f2, f4, f6, . . . pass through the filters 22 having corresponding passbands and are extracted as a test signal. The extracted test signal is sent to the DUT from an RF sending unit (not shown).

Figure 16:
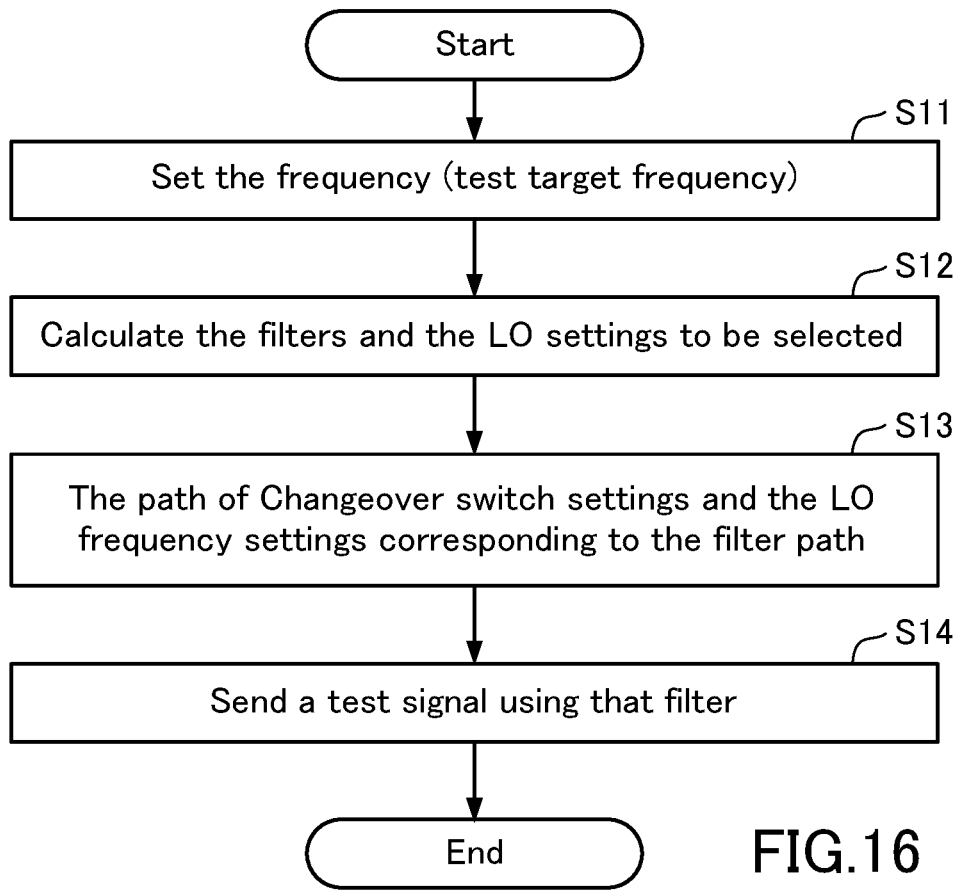
FIG. 16 is a flowchart showing a signal transmission control operation in a signal generator using a filter bank circuit according to an embodiment of the present invention.

The signal transmission control operation in the signal generator 3 during the above-described DUT test is performed according to the flowchart shown in FIG. 16. In order to control signal transmission in the signal generator 3 for testing the DUT, a frequency, that is, a frequency to be tested is set, for example, by a predetermined setting operation on the operation unit 160 (step S11).

Next, the control unit 150E calculates or determines the filters 21, 22 to be selected, from the filter groups G1, G2 in the filter bank circuit 10A and the local frequency setting conditions (LO setting) based on the set test target frequency (step S12).

Next, the control unit 150E determines the path of the changeover switch 20E corresponding to the filters 21, 22 to be selected, determined in step S12, and then the filter changeover control unit 151E performs the changeover control of the switch 20E to select either filter group G1 or G2 to which a filter to be selected from the filters 21 and 22 belongs (step S13).

By this, in the filter bank circuit 10E, one of the filter groups G1 and G2 that includes a filter to be selected from the filters 21 and 22 is selected by the changeover control of the switch 20E. The RF signal outputted from the frequency conversion unit 100E passes through the selected filter group G1 or G2 and is inputted to the input terminal 20b1 or 20c1 of the changeover switch 20E. The inputted signal is outputted from the output terminal 20a1 of the changeover switch 20E. The control unit 150E controls the frequency component signal outputted from the output terminal 20a1 of the changeover switch 20E to be sent as a test signal (step S14).

Thus, the signal generator 3 according to the present embodiment includes the frequency conversion unit 100E that provides a test signal of an intermediate frequency band, outputted from the signal generation unit 130, to the mixer 111E together with a local signal outputted from the local signal generator 112E and converts into a signal of a millimeter wave band. The signal generator 3 varies the frequency of the local signal according to the test target frequency for testing the DUT, and transmits the signal frequency-converted by the frequency conversion unit 100E as the test signal for the DUT. The signal generator 3 further includes the filter bank circuit 10E provided after the frequency conversion unit 100E. The filter bank circuit 10E can be configured by the above-described filter bank circuits 10A, 10B, 10C, 10D, and the like, considering that the signal flow is reversed.

This signal generator 3 has a filter changeover control unit 151E that switches and controls the changeover switch 20E to select the filter group G1 or G2 having a passband corresponding to the frequency to be tested and send out the signal filtered by the filter group G1 or G2 as a test signal.

By this configuration, the signal generator 3 according to the present embodiment can extract, from a frequency-converted signal inputted to the filter bank circuit 10E, the frequency components corresponding to a plurality of (n m) (in the example shown in FIG. 15, (2×4)=8) passbands that overlap each other keeping overlapping bands to avoid loss of the test signal, and output them having unnecessary radio waves suppressed as the test signal. Thus it is possible to perform smooth test on the DUT for signals in all bands by using the filter groups G1 and G2 that do not have moving parts without requiring long changeover time or complicated changeover control unlike mechanically switched filter banks (see FIG. 17).

Further, the control method of the filter bank circuit 10E in the signal generator 3 using the filter bank circuit 10E according to the present embodiment includes: a setting step for setting the test target frequency (see step S11 in FIG. 16); a determining step of calculating or determining one(s) of the filters 21, 22 to be selected, from the filter groups G1, G2 based on the set test target frequency (see step S12 in FIG. 16); a controlling step of setting the path of the changeover switch 20 corresponding to the selected one(s) of the filters 21, 22 and controlling the changeover switch 20 so as to select one of the filter groups G1, G2 to which the selected one(s) of the filters 21, 22 belongs (see S13 in FIG. 16); and a step of extracting a frequency component that passes through the filters 21 or 22 determined in the determining step, out of the filter groups G1, G2 switched in the controlling step, for sending out a test signal (see step 14 in FIG. 16).

According to this control method of the filter bank circuit 10E, the test target frequency is assigned to one(s) of multiple (n×m) passbands that overlap each other, and the frequency component of each passband can be extracted, having unnecessary radio waves suppressed, as the test signal. By simple changeover control of the changeover switch 20, it is possible to eliminate bands that cannot be tested, and it is also possible to shorten the changeover time of the changeover switch 20.

In FIG. 15, an example is given in which the filter bank circuit 10E has two filter groups (filter groups G1 and G2), three filters are included in each of the filter groups G1 and G2, and frequencies f1 to f8 are shown. Similarly to the embodiments described above, the number of filter groups, the number of filters within a filter group, and the number of frequencies can be any numbers n, m, and (n×(m+1)), respectively. When n filter groups are provided, the changeover switch 20 is a one-pole n-throw type switch (SPnT switch).

Further, it goes without saying that, also in the signal generator 3 according to the present embodiment, various modifications or applications may be made to each element in the filter bank circuit 10E, similar to the filter bank circuits 10A, 10B, 10C, and 10D used in the spectrum analyzer 1 described above.

INDUSTRIAL APPLICABILITY

As described above, the present invention uses an electronically switchable switch and a plurality of filter groups to switch the filter groups with simple changeover control, and secures the overlap of passbands in the whole of the filter groups while securing guard bands within each filter group, thereby making it possible to realize the effect of being applicable to measurements or tests of all bands, and is useful for filter bank circuits, spectrum analyzers, signal analyzers, signal generators, and control methods for filter bank circuits in general.

EXPLANATION OF REFERENCE NUMERALS

1 Spectrum Analyzer
2 Signal Analyzer
3 Signal Generator
9 Local Oscillation Signal Source
10, 10A, 10B, 10C, 10D, 10E Filter Bank Circuit
20, 20-1, 20E Changeover Switch (Switch)
20a Input Terminal
20a1 Output Terminal
20b, 20c, 20d Output Terminal
20b1, 20c1 Input Terminal
20b, 20c, 20d Output Terminal
20b1, 20c1 Input Terminal
21, 21a, 21b, 21c Filter (Filter Circuit)
22, 22a, 22b, 22c Filter (Filter Circuit)
23a, 23b, 23c Filter (Filter Circuit)
25, 26 Hybrid
27 Band-Pass Filter (BPF)
41a, 41b, 41c, 42a, 42b, 42c Filter (Filter Circuit)
45a, 45b, 45c, 45d, 45e, 45f Circulator
46a, 46b, 46c, 46d, 46e, 46f BPF
100, 100e, 100f Frequency Conversion Unit
101 Front-End Circuit
111, 111-1, 111-2, 111-3, 111-4, 111-5, 111-6, 111-7, 111-8, 111E, 111f Mixer
112, 112-1, 112-2, 112e, 112f Local Signal Generator
113, 113E, 113F Filter
120 Detector
125 ADC
130 Signal Generation Unit
150, 150E, 150f Control Unit
151, 151E, 151f Filter Changeover Control Unit (Changeover Control Unit)

152 Frequency Sweep Control Unit (Local Frequency Setting Unit)
152E, 152F Frequency Control Unit (Local Frequency Setting Unit)
153 Spectrum Data Acquisition Unit
153E Signal Generation Control Unit
153F Signal Analysis Unit
160 Operation Unit
161 Display Unit
G1, G2, G3 Filter Group
Ol1, Ol2, . . . , Ol7 Overlapping Band

What is claimed is:

1. A filter bank circuit, comprising:
a one-pole n-throw type switch that performs changeover among n output terminals connected to one input terminal, where n is an integer of 2 or more; and
n filter groups respectively connected to the n output terminals, each of the filter groups having m filter circuits, where m is an integer of 2 or more;
wherein each of the filter circuits in the n filter groups has a passband that does not overlap with a passband of any other filter circuit in the same filter group, and overlaps with a passband of one filter circuit in other one filter group by a predetermined bandwidth,
wherein each of the n×m filter circuits comprises a circulator and a band-pass filter,
wherein the circulator has an input port, an output port, and a transfer port, when a frequency component inputted to the input port is a frequency component corresponding to a passband of the each filter circuit, the circulator outputs the frequency component to the output port, and when the frequency component inputted to the input port is outside the passband, the circulator outputs the frequency component from the transfer port to an input port of the next stage, and
wherein the band-pass filter is connected to the output port, and a passband of the band-pass filter is set according to the passband of the each filter circuit.

2. The filter bank circuit according to claim 1, wherein the predetermined bandwidth is set to a band wider than a band occupied by a signal inputted to the filter bank circuit for filtering.

3. The filter bank circuit according to claim 1, wherein when a signal having a predetermined frequency component is inputted to the filter bank circuit, the predetermined frequency component is extracted by dividing the signal into n×m frequency components respectively corresponding to the n×m mutually overlapping passbands of the n×m filter circuits.

4. The filter bank circuit according to claim 1, wherein each of the n×m filter circuits is constituted by a filter bank that has a branch line coupler and passes a frequency component of a passband set corresponding to the each filter circuit.

5. The filter bank circuit according to claim 1, wherein each of the n×m filter circuits is constituted by a band-pass filter that passes a frequency component of a passband set corresponding to the each filter circuit.

6. The filter bank circuit according to claim 1, wherein each of the n×m filter circuits is constituted by a combination of a high-pass filter and a low-pass filter to pass a frequency component of a passband set corresponding to the each filter circuit.

7. A spectrum analyzer comprising:
a frequency conversion unit that inputs a signal under test of a predetermined frequency to a mixer together with a local signal outputted from a local signal generator, and has a filter that extracts a signal in a predetermined intermediate frequency band from a signal outputted from the mixer; and a detector that detects a signal in the intermediate frequency band, wherein the spectrum analyzer varies a frequency of the local signal according to a frequency to be analyzed, and determines the spectrum characteristics of the signal under test, the spectrum analyzer comprising:
the filter bank circuit according to claim 1 that is provided before the frequency conversion unit; and
a changeover control unit that controls the switch, to which the signal under test is inputted at the input terminal, so that one filter group is selected among a plurality of the filter groups repeatedly in order by group, according to the frequency to be analyzed;
wherein the spectrum analyzer sequentially extracts and detects a frequency component that passes through a filter circuit having a passband corresponding to the frequency to be analyzed, each time one filter group is selected by the switch repeatedly in order.

8. The spectrum analyzer according to claim 7, further comprising:
a plurality of local signal generators respectively provided corresponding to a plurality of the filter groups; and
a plurality of mixers respectively provided to a plurality of the filter circuits that constitute the plurality of the filter groups; and
wherein the spectrum analyzer comprises a local frequency setting unit that sets local frequencies of the local signal generators for the mixers corresponding to the filter circuits in the filter group to be selected next, while measuring the spectrum characteristics by the filter circuits in the currently selected filter group.

9. A signal analyzer comprising:
a frequency conversion unit that inputs a signal under test of a predetermined frequency to a mixer together with a local signal outputted from a local signal generator and has a filter that extracts a signal in a predetermined intermediate frequency band from a signal outputted from the mixer; and a signal analysis unit that analyzes a waveform of a signal obtained by converting the signal in the predetermined intermediate frequency band to a digital signal by an analog-to-digital converter, wherein the signal analyzer varies the frequency of the local signal according to a frequency to be analyzed, and analyzes the waveform of the signal under test, the signal analyzer comprising:
the filter bank circuit according to claim 1 that is provided before the frequency conversion unit; and
a changeover control unit that controls the switch, to which the signal under test is inputted at the input terminal, so that one filter group is selected among a plurality of the filter groups, according to the frequency to be analyzed;
wherein the signal analyzer extracts a frequency component that passes through a filter circuit having a passband corresponding to the frequency to be analyzed, converts a signal of the frequency component from an analog signal to a digital signal, and then analyzes the waveform of the signal of the frequency component, for each selected filter group.

10. A signal generator comprising a frequency conversion unit that inputs a test signal of an intermediate frequency band, outputted from a signal generation unit, to a mixer together with a local signal outputted from a local signal generator and converts into a signal of a frequency higher than the intermediate frequency band, wherein the signal generator varies the frequency of the local signal according to a test target frequency for testing a device under test (DUT), and transmits a signal frequency-converted by the frequency conversion unit as the test signal for the DUT, the signal generator further comprising:
- the filter bank circuit according to claim 1, into which the frequency-converted signal is inputted, the filter bank circuit being provided after the frequency conversion unit, wherein the switch has a configuration that original output terminals function as input terminals and original input terminal functions as an output terminal; and
- a changeover control unit that controls the switch, into which signals outputted from the filter groups are inputted at the input terminals, so that a filter group including a filter circuit having a passband corresponding to a test target frequency is selected;
- wherein a signal that has passed through the selected filter group is transmitted as the test signal from the output terminal.

* * * * *